United States Patent
Johnson

(10) Patent No.: US 9,418,062 B2
(45) Date of Patent: Aug. 16, 2016

(54) METHOD AND SYSTEM FOR SITUATIONAL LANGUAGE INTERPRETATION

(75) Inventor: Mat Johnson, Two Harbors, MN (US)

(73) Assignee: GeaCom, Inc., Duluth, MN (US)

( * ) Notice: Subject to any disclaimer, the term of this patent is extended or adjusted under 35 U.S.C. 154(b) by 0 days.

(21) Appl. No.: 13/122,374

(22) PCT Filed: Jan. 21, 2009

(86) PCT No.: PCT/US2009/031547
§ 371 (c)(1),
(2), (4) Date: Jun. 15, 2011

(87) PCT Pub. No.: WO2009/092096
PCT Pub. Date: Jul. 23, 2009

(65) Prior Publication Data
US 2011/0246174 A1 Oct. 6, 2011

(51) Int. Cl.
*G06F 17/28* (2006.01)
(52) U.S. Cl.
CPC .................................. *G06F 17/289* (2013.01)
(58) Field of Classification Search
CPC . G06F 17/28; G06F 17/2809; G06F 17/2818; G06F 17/2827; G06F 17/2836; G06F 17/2845; G06F 17/2863; G06F 17/2872; G06F 17/289; G06F 17/275; G06F 19/322; G06F 19/328; G06F 19/3443; G06F 19/327; G06Q 50/22; G06Q 50/24
USPC .......... 704/1–9, 270–278; 715/703; 705/7.32, 705/7.14, 3, 26.1; 600/300; 434/363
See application file for complete search history.

(56) References Cited

U.S. PATENT DOCUMENTS

| | | | | |
|---|---|---|---|---|
| 4,428,733 A | * | 1/1984 | Kumar-Misir | B42D 11/00 283/115 |
| 6,618,734 B1 | * | 9/2003 | Williams | G06Q 10/06 |
| H2098 H | * | 3/2004 | Morin | 704/2 |

(Continued)

FOREIGN PATENT DOCUMENTS

| CN | 1226713 A | 8/1999 |
|---|---|---|
| CN | 101025735 A | 8/2007 |

(Continued)

OTHER PUBLICATIONS

PCT International Search Report, Jul. 29, 2009.

*Primary Examiner* — Michael Colucci
(74) *Attorney, Agent, or Firm* — Westman, Champlin & Koehler, P.A.; Z. Peter Sawicki; Amanda Prose

(57) ABSTRACT

A method and system for facilitating an interview where the interviewer and interviewee speak different languages is described. The system includes a speaker to output audio information, at least one interface to communicate with a display device, a processor and a memory accessible to the processor. The memory includes instructions executable by the processor to determine an interviewee language from a plurality of languages, store collected data and data related to the determined interviewee language, receive a first interviewee information item and a second interviewee information item associated with a topic selection from an interviewer system. The instructions further include instructions to provide the first interviewee information item to the speaker for acoustic output in the interviewee language and to provide the second interviewee information item to the at least one interface to communicate with the display device.

24 Claims, 25 Drawing Sheets

(56) References Cited

U.S. PATENT DOCUMENTS

| | | | | |
|---|---|---|---|---|
| 6,981,040 | B1* | 12/2005 | Konig et al. | 709/224 |
| 7,398,270 | B1* | 7/2008 | Choi | G06F 17/30705 |
| 9,189,568 | B2* | 11/2015 | Munro, Jr. | G06F 17/30976 |
| 2002/0032561 | A1* | 3/2002 | Ishikawa et al. | 704/3 |
| 2003/0033312 | A1* | 2/2003 | Koizumi | G06F 17/2836 |
| 2003/0036911 | A1 | 2/2003 | Morin | |
| 2003/0093322 | A1* | 5/2003 | Sciuk | G06Q 10/1053 |
| | | | | 705/7.32 |
| 2003/0146926 | A1* | 8/2003 | Valdes | G06F 17/217 |
| | | | | 715/703 |
| 2003/0208352 | A1* | 11/2003 | Lee | G06F 17/289 |
| | | | | 704/2 |
| 2004/0167380 | A1* | 8/2004 | Simon | A61B 5/16 |
| | | | | 600/300 |
| 2005/0038662 | A1* | 2/2005 | Sarich et al. | 704/277 |
| 2005/0080643 | A1* | 4/2005 | McLennan et al. | 705/1 |
| 2005/0171685 | A1 | 8/2005 | Leung et al. | |
| 2005/0261941 | A1* | 11/2005 | Scarlat | G06Q 50/24 |
| | | | | 705/3 |
| 2006/0025206 | A1* | 2/2006 | Walker et al. | 463/20 |
| 2006/0053046 | A1* | 3/2006 | Bonnstetter | G06Q 10/00 |
| | | | | 705/7.14 |
| 2006/0112050 | A1* | 5/2006 | Miikkulainen et al. | 706/46 |
| 2006/0218031 | A1* | 9/2006 | Weinberg | G06Q 30/02 |
| | | | | 705/7.32 |
| 2006/0259307 | A1* | 11/2006 | Sanders | G06F 17/289 |
| | | | | 705/26.1 |
| 2007/0100637 | A1* | 5/2007 | McCune | 704/277 |
| 2007/0213600 | A1* | 9/2007 | John et al. | 600/300 |
| 2007/0244858 | A1* | 10/2007 | Streetman | 707/3 |
| 2007/0258614 | A1* | 11/2007 | Langberg | 381/379 |
| 2007/0259325 | A1* | 11/2007 | Clapper | 434/350 |
| 2008/0015418 | A1* | 1/2008 | Jarrell | G06F 19/327 |
| | | | | 600/300 |
| 2008/0208596 | A1* | 8/2008 | Heinze | G06F 17/28 |
| | | | | 704/277 |
| 2008/0270218 | A1 | 10/2008 | Scott et al. | |
| 2009/0171667 | A1* | 7/2009 | Rivera | 704/275 |

FOREIGN PATENT DOCUMENTS

| | | |
|---|---|---|
| DE | 102004055762 A1 | 5/2006 |
| JP | 17107595 A | 4/2005 |
| KR | 1020060017340 A | 2/2006 |

* cited by examiner

METHOD AND SYSTEM FOR SITUATIONAL LANGUAGE INTERPRETATION

This application is a Section 371 National Stage Application of International Application No. PCT/US2009/031547 filed Jan. 21, 2009 and published as WO 2009/092096 A2 on Jul. 23, 2009, which is based on and claims the benefit of U.S. patent application Ser. No. 12/009,229, filed Jan. 17, 2008, now U.S. Pat. No. 8,239,185, the contents of which are hereby incorporated by reference in their entirety.

FIELD

The present disclosure generally relates to situational language interpretation. More particularly, it relates to a method and apparatus for language interpretation to facilitate an interview process whereby an interviewer can interview a subject who speaks a different language from the interviewer.

BACKGROUND

There are many contexts in which an interviewer needs to elicit information from a human subject. When the interviewer and the subject do not speak a common language, their ability to communicate can be severely limited. In the context of a medical emergency, the language barrier can be particularly problematic because of the urgency for an appropriate remedial response. According to the National Virtual Translation Center (NVTC) of the United States Government (http://www.nvtc.govllotwIUSlanguages.html), more than 300 languages are spoken in the United States today. To be effective, the system should be adapted to deal with the case where the interviewer and interviewee each speak a single language and the case where they speak different languages. According to the NVTC, about 80 percent of United States residents speak only English. Further, some immigrant populations within the United States struggle to learn the English language. According to the 2000 U.S. Census, of about 168,065 residents nationally who speak Hmong, for example, about 28 percent speak English "not well" or "not at all."

SUMMARY

In a particular embodiment, a method and apparatus are disclosed for facilitating an interview where the interviewer and interviewee speak different languages. In an embodiment, a system is disclosed that includes a speaker to output audio information, at least one interface to communicate with a display device, a processor and a memory accessible to the processor. The memory includes instructions executable by the processor to determine an interviewee language from a plurality of languages, store collected data and data related to the determined interviewee language, receive a first interviewee information item and a second interviewee information item associated with a topic selection from an interviewer system. The instructions further include instructions to provide the first interviewee information item to the speaker for acoustic output in the interviewee language and to provide the second interviewee information item to the at least one interface to communicate with the display device. In a particular embodiment, the system includes a headset having a headband and at least one ear cup, where the at least one ear cup is adjustable between a head-mount configuration and a broadcast configuration.

In another particular embodiment, a method is disclosed that includes receiving an interviewer language selection from an interviewer system at a server system and providing a ranked list of topics in the interviewer language to the interviewer system, where a ranking of each topic in the ranked list is based at least in part upon a respective probability associated with each topic. The method further includes receiving an interviewee language selection from the interviewee system at the server system, receiving data related to a selected topic of the ranked list of topics from the interviewer system, and determining a first interviewee information item associated with the selected topic using logic associated with the server system. Further, the method includes transmitting the determined first interviewee information item to an interviewee system in the interviewee language according to the received interviewee language selection.

In still another particular embodiment, a headset is disclosed that includes at least one ear cup including a speaker to produce an audible signal and a headband including at least one arch portion defining an opening direction. The head band further includes a pluggable component bus adapted to electrically couple to one or more components. The headset further includes an attachment mechanism to couple the at least one ear cup to the head band. The attachment mechanism adapted to selectively pivot the at least one ear cup between a head-mount configuration and a broadcast configuration. The headset also includes logic adapted to selectively adjust a volume limit associated with the speaker. The logic is adapted to adjust the volume limit to a first limit in the head-mount configuration and to a second limit in the broadcast configuration.

DETAILED DESCRIPTION

Although the following discussion is in reference to particular embodiments, workers skilled in the art will recognize that changes may be made in form and detail without departing from the spirit and scope of the invention. The drawings and associated descriptions are provided for illustrative purposes only, and are not intended to limit the scope of the invention. Practitioners in the art will recognize that many other embodiments of the inventive concepts are possible. All such embodiments should be considered within the scope of the invention.

Apparatus

Figure 1:
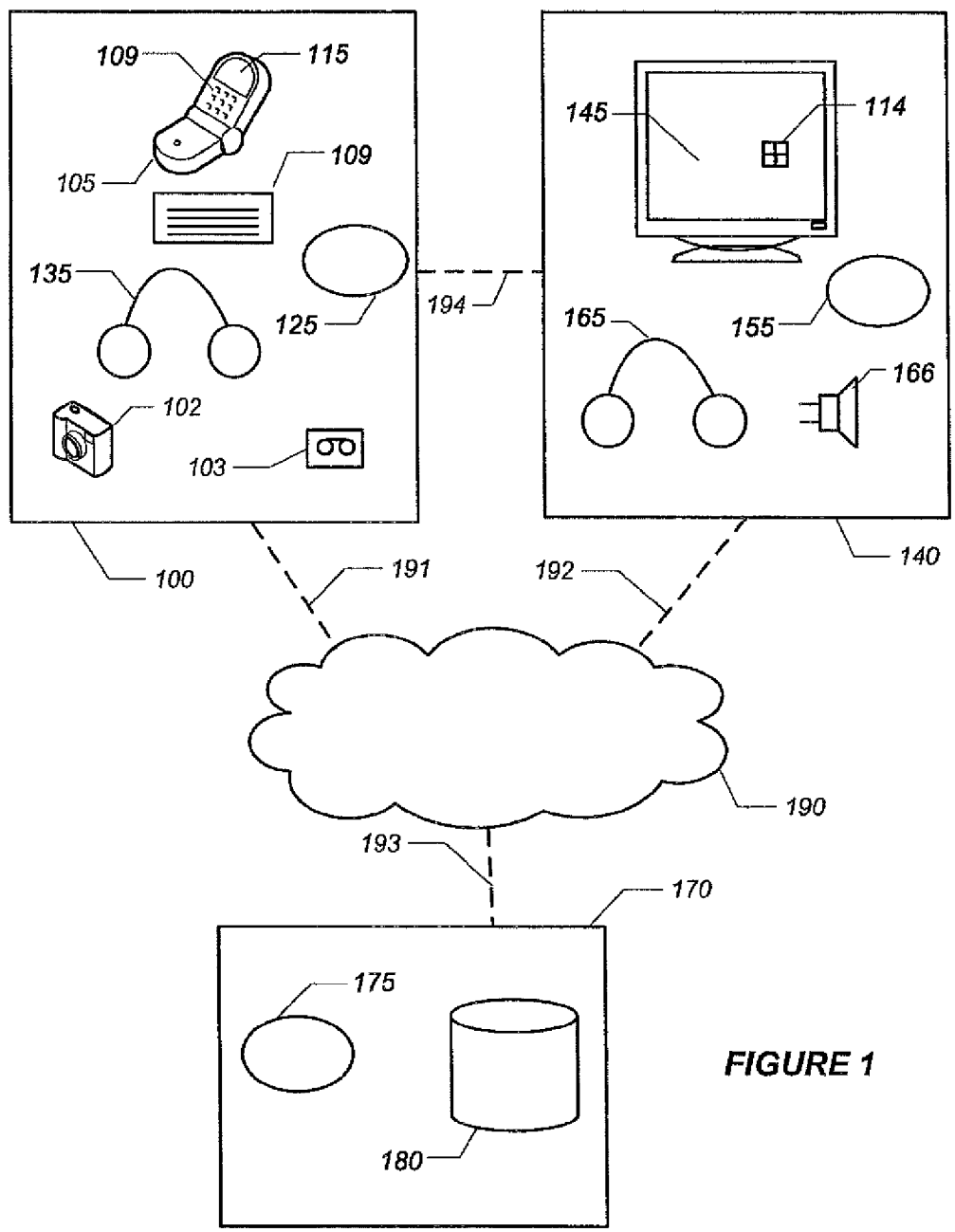
FIG. 1 is a diagram of a particular illustrative embodiment of a system for situational language interpretation.

FIG. 1 is a diagram of a particular illustrative embodiment of a system including an interviewer digital electronic system 100 that is adapted to communicate with an interviewee digital electronic system 140 and a server system 170 via a communication network 190 and communications links 191-194. In a particular embodiment, the interviewer system 100, the interviewee system 140, and the server system 170 can be bundled into a single component of electronic hardware, such as a computer system. In another particular embodiment, a single system can include two or more of the systems 100, 140, and 170. Within a given system, all components can communicate with each other as necessary to perform their respective roles via wires or communication buses, via one or more wireless mechanisms, or any combination thereof. The interviewer system 100 can include a portable communication device, such as a mobile telephone 105.

The interviewer system includes logic 125 that is adapted to receive user input via an input 109, such as a keyboard or keys (soft keys or buttons) of the mobile telephone 105 and is adapted to communicate data to a display screen, such as the display screen 115 of the mobile telephone, a computer display screen, or any combination thereof. In a particular embodiment, the display screen 115 is adapted to display images, video, text, or any combination thereof. The logic 125 can be implemented in hardware, software, or any combination thereof. Additionally the logic 125 is adapted to communicate audio data to a headset 135, to receive visual data from a camera 102, which may be a digital camera adapted to receive still images, moving images, video and audio data, or any combination thereof. Further, the interviewer system 100 includes an audio input system 103 to record audio data related to the interview process. Such audio and visual recorded information can be included in the records for a particular interviewee and/or can be used for analysis and diagnosis in real time. The software allows the interviewer to associate audio clips, video clips, still photographs, or any combination thereof with the interviewee and with an incident or session. The interview data, including audio, video, text, pictorial, other data, or any combination thereof, can be stored in a memory, such as the memory 180 associated with the server system 170, within a memory of the interviewer system 100 (such as a hard disk, a solid-state memory, a tape drive, a recordable compact disc (CD), another memory device, or any combination thereof), within a memory associated with a headset storage system as described below, or any combination thereof.

The interviewer system 100 further includes other circuitry, including interface and communications circuitry (such as network interface circuitry, universal serial bus (USB) circuitry, other interface circuitry, or any combination thereof) to facilitate communication between the interviewer system 100 and other devices. In a particular embodiment, the interviewer system 100 is adapted to send such captured visual and audio information to the server system 170 for recording collected information about the interviewee and/or about an incident. The interviewer system 100 can also include other sensors such as thermometers and blood pressure monitors, and equipment requiring power such as lamps and medical instruments for diagnosis or treatment.

In a particular embodiment, the interviewer system 100 includes logic 125 that facilitates a variety of functions relating to the interview, including, for example: communication to the interviewer of information about a method for treating a patient or for using a new type of instrument; specification and storage of the language of the interviewee; presentation to the interviewer of choices to assist the interviewer in conducting the interview and issuing instructions; permitting the interviewer to enter information regarding the interviewee based upon the interviewer's own observations; allowing the interviewer to select a topic about which information is to be communicated to the interviewee, in the form of one or more questions, images, or instructions; communicating words to the interviewee in audio form or as text or images displayed on a screen; receiving input from the interviewee who uses the input capabilities of the interviewee system 140; and storing the questions asked, instructions given, and interviewee responses. The facilitating logic 125 can be implemented in software or in digital electronic hardware, or some combination of the two.

The interviewee system 140 includes logic 155 that is adapted to communicate visual data to a display device 145, which can be a touch-sensitive display to facilitate user interactions. The logic 155 is adapted to communicate virtual key information for display via the display device 145 to an interviewee. Further, the logic 155 is adapted to communicate audio data in an appropriate language to a headset 165, to a speaker 166, to another audio output device, or any combination thereof. Additionally, the logic 155 is adapted to provide a graphical user interface (GUI) including virtual controls 150 to the display device 145 for interaction with a user. The virtual controls 150 can be user-selectable elements 114, such as soft keys, buttons, radio buttons, check boxes, lists, or text boxes other inputs, or any combination thereof, which can be accessed by a user via the touch screen of the display device 145. In a particular embodiment, the interviewee system 140 can also include a keyboard, mouse, pointing device (e.g., a mouse or a stylus), keyboard, buttons, input device, or any combination thereof to facilitate user interactions with the GUI. The interviewee system 140 can further include a microphone (not shown) to receive audio data.

In a particular example, the interviewer display screen 115 can have the same general capabilities as the interviewee screen. In another particular example, the interviewer display screen 115 has text input and output capability only, without the ability to display images. In an embodiment, the interviewer display screen 115 and interviewee display screen 145 can be combined into a single device. In this particular instance, the display can be divided into two halves, one for the interviewer and the other for the interviewee. Alternatively, two display screens utilizing a split-screen or extended screen functionality may be employed. Additionally, the interviewer input device and the interviewee input device might be the same, for example, where the interviewee and interviewer both interact by touch with a single tablet PC.

The server system 170 includes logic 175 that is adapted to communicate with a memory 180, which can be adapted to store data related to an interview, including video data, audio data, text data, or any combination thereof. In particular, the data can include question and response information from both an interviewer and an interviewee (received from the interviewer system 100 and the interviewee system 140). Further, the server system 170 may include a display device, such as a computer monitor. Further, in a particular example, the memory 180 can store a plurality of questions, diagnostic information, other information, or any combination thereof. It should be understood that the memory 180 can be housed within a single device (such as a computer or a stand-alone memory device) or can be distributed across multiple devices.

In a particular embodiment, the memory 180 is adapted to store topics, questions, instructions, and possible answers to yes/no and multiple-choice questions. Topics, summaries, questions and instructions can be stored electronically in the language of the interviewer in text form. In a particular embodiment, the server system 170 can include interpretation software (or can communicate with an interpretation system) to derive the text/audio in the particular language of the interviewee from the stored text. It should be understood that the interpretation system is adapted to convey meaning and to represent information in a culturally relevant fashion, as compared to direct translation, which may or may not be understandable within a given cultural context. In this example, the interpretation system may initially translate a particular communication word-for-word, and then interpret the translation to convey the message of the particular communication in the appropriate language and in a culturally relevant manner. In another embodiment, the interpretation system may be adapted to interpret the communication directly.

Alternatively, the data can be stored in multiple languages. Questions and instructions are also stored in both text and audio recordings in a variety of languages for the purpose of expression to possible interviewees. As with the location of the software, the location of the storage is not critical to the invention. In one embodiment, all questions and answers are stored on a central server system 170 and accessed by wireless communication across a wide area network. Centralizing the topics onto a server, such as the server system 170, allows the content to be updated on a continuous basis and made available to all interviewer and interviewee systems 100 and 140 in the field. On the other hand, some embodiments do not require a separate server, allowing the invention to operate in totally remote locations, without a network, server, or hospital. As will be described below, in a particular embodiment, a headset can serve as a collection and storage hub for measurements such as temperature and blood pressure readings, and video and audio information.

In a particular embodiment, the logic 125 of the interviewer system 100 is adapted to assist an interviewer in extracting information from an interviewee, either via a structured set of questions or via free-form question and answer interactions. In a particular example, the interviewer system 125

For illustration, FIG. 1 shows separate communications links 191-194 between all three systems. Although some communication is required between each pair of systems, such communication can be indirect. In a particular example, communications between the interviewee system 140 and the server system 170 may be hosted through the interviewer system 100, such as via a network 190, which can be a personal area network (PAN), a local area network (LAN), or a wide-area network (WAN) such as the Internet.

In a particular embodiment, the logic 155 of the interviewee system 140 is adapted to determine a language of a particular interviewee via interviewee inputs associated with a graphical user interface (GUI) and associated user selectable elements 114 (virtual controls 114) included within the GUI provided to the user via the display device 145. In a particular example, the particular language may be selected by the interviewee via an interactive map on the display device 145. In a particular illustrative example, in a healthcare context, information can be presented to the interviewee in a three-dimensional form. For example, the interviewee can be presented with a three-dimensional image of a human body via a GUI on the display screen 145 with which a user may interact. In a particular example, the interviewee can interact with the touch screen display 145 to allow a user to rotate and touch portions of the image to make selections. For example, the software may present the three-dimensional image of a human body together with an instruction to answer the question, "Show me where it hurts." By interacting with the touch screen display 145 to manipulate the three-dimensional image, the user can communicate the information to the interviewer. In a particular embodiment, the interviewee system 140 can utilize graphical or audio choices or instructions whenever possible, reducing or eliminating textual queues, so that the interviewee need not be expected to read.

In a particular embodiment, the software is adapted to identify the language of the interviewee via interviewee interaction with a graphical user interface (GUI) presentation on the interviewee display screen 145. The GUI presents the interviewee with a map at coarse resolution, such as a world map. In response to the interviewee touching an area of the map, the GUI presents a new map at higher resolution based on the interviewee's selection. Successive interactions can result in successively higher resolutions of the map until the interviewee is able to point to a country or region, whereby his or her language can be identified by the logic 155 (or by logic 125 or 175) implemented in hardware or software.

Once the appropriate language is determined, the logic 155 is adapted to present text and audio data to the interviewee in the determined (selected) language. In a particular example, the logic 155 is adapted to retrieve (or receive) text and audio data in the selected language and appropriate for the interview context from local storage, from memory 180 at the server system 170, from the interviewer system 100, or any combination thereof. Additionally, the logic 155 is adapted to provide the retrieved information to the user via the display device 145, via sound communication equipment (headset 165 or speaker 166), or any combination thereof.

In a particular embodiment, the interviewer system logic 125 is also adapted to obtain a choice of an interviewer language from the interviewer. The interviewer language might be selected by the interviewer via interactions with a GUI presented on the display device 115. The choice of the interviewer language may be used by the logic 125 to retrieve interview data in a selected language from memory, such as local memory, memory associated with the interviewee system 140, or memory 180 within the server system 170. Further, the logic 125 may be adapted to retrieve preferences associated with a particular interviewer. For example, the name of the interviewer might be used to retrieve a preferred language from storage 104. In other embodiments, the interviewer language might be assumed to be some particular language, such as U.S. English.

In a particular embodiment, the interviewer system 100 includes logic 125 adapted to generate a GUI including a ranked list of interview topics in the interviewer language for display on the display device 115. In a particular example, the ranking of the rank list can be determined at least in part upon a respective probability associated with each topic. For example, in the context of emergency health care, the topics might be alternative lines of questioning that might be asked of a patient interviewee. The list can include an initial line of questions and/or an initial selection list. For example, if an injury is visible to the interviewer, the interviewer may select a topic related to the particular injury. Alternatively, if the problem is not visibly apparent, the line of questions may begin with a general inquiry, such as "What is wrong?" Based on the response, the interviewer system logic 125 (or selections by the interviewer) may suggest a line of questioning that may be associated with a candidate diagnosis of the patient's condition. For example, an emergency service provider might find a patient on the ground. This might be due to a heart attack, a stroke, a slip and fall accident, a broken bone, or other causes. Each possible cause can be represented by a separate topic. A topic might be associated with a single question, a single instruction, or a sequence of questions or instructions to be delivered to the interviewee.

In a particular embodiment, a particular list of topics is presented by the logic 125 at any given point in the interview based upon a variety of factors. For example, in the context of emergency medical care, the factors influencing the content or arrangement of a list of topics could include discretion of the interviewer, input from the interviewee in response to earlier questioning, observations by the interviewer, measurements taken by various kinds of instruments (blood pressure, temperature, pupil dilation, other information, or any combination thereof), comments from friends or relatives of the interviewee, information from witnesses, historical records of the interviewee, other information, or any combination thereof. Historical records of the interviewee may be available through the server system 170 from the server electronic storage (memory 180). The historical records can include "session data" that tracks a patient through an incident from first response until final resolution.

Further, in an embodiment, if the topics are possible causes of a patient's condition, then the topics might be ranked by the probability, estimated from statistics about the general public and information known about the patient through this point in the interview process. However, the probability of each cause might not be the only factor taken into account in some embodiments. For example, the expected loss of not treating for a particular cause, listed as a topic, when that cause is the true cause of a problem, might also be used in determining the ranking of that cause. Expected loss due to incorrectly treating for some candidate cause, when that candidate is not the true cause, might also be incorporated into the ranking. In a particular embodiment, the server system logic 175 can generate the rankings, possibly utilizing information sent to the server over a communications link from the interviewer system 100 or the interviewee system 140. The analysis of what to ask or how to treat the interviewee, or how to instruct the interviewer with respect to treatment and techniques, may utilize sophisticated statistical modeling techniques and artificial intelligence implemented with computer technology.

In a particular illustrative embodiment, the interviewer system logic 125 is adapted to receive a topic selection from the ranked list via interviewer interaction with the GUI on the interviewer graphics screen 115. The interviewer system 100 allows the interviewer the discretion to choose the most highly ranked topic, a topic with a lower ranking, or to bypass the topic list altogether.

In response to a choice of a topic (a selection by the interviewer), some embodiments of the system (the interviewer system 100, the interviewee system 140, the server system 170, or any combination thereon include logic (logic 125 155, and 175, respectively) adapted to (i) receive a first information item and a second information item associated with the topic selection; (ii) transmit the first information item in audio form in the interviewee language using the interviewee sound communication equipment 160; and (iii) present the second information item in visual form using the interviewee graphics screen 145. For example, in the emergency medical treatment context, the first information could be a request to the interviewee to point to the screen 145 to select the part of his/her body that hurts. The second information item could be an image of the human body that is to allow him/her to respond to the question by touching an appropriate point on the interviewee graphics screen 145.

In a particular embodiment, the server system logic 175 is adapted to receive a topic selection from the interview system 100, to associate information related to the interviewee and/or the situation with the topic selection, to transmit the first information in the language of the interviewee to the interviewee system 140, and to transmit second information in the language of the interviewer to the interviewer system 170. In some of these embodiments, the first information item and the second information item can have the same meaning, but in different languages appropriate for the interviewer and the interviewee. In a first embodiment, the first information item and the second information item can be the same. In another embodiment, the second information item can represent a summary of the first information item (or vice versa). The summary can, for example, be a capsule summary of what is communicated to the interviewee. In a particular example, where the first information item is communicated to the interviewee system 140 and the second information is communicated to the interviewer system 100, a capsule summary can free the interviewer to concentrate on critical tasks other than communicating with the interviewee, such as observation, diagnosis, analysis, or treatment, without missing the interviewee's communications.

At any point in the interview process, given the information that has already been observed by the interviewer or elicited from the interviewee, a next line of questioning or treatment to be pursued might not be obvious. In such a situation, the logic 125 of the interviewer system 100 can present the interviewer with options and give the interviewer discretion to choose from among them. To assist the interviewer, the options can be ranked in a list based upon the expected preference of each option, from best to worst, based on relevance in light of the available information. In a particular embodiment, each particular option can include a relevance indicator, such as a score from one to five stars, indicating a relative strength of that particular option. Some factors that might be included in determining the ranking include: (1) the probability that a given option represents a correct course of action; (2) the expected loss or damage that would occur if a given option is the correct one but is not selected; and (3) the expected loss or damage that would occur if a given option is selected, whether or not the option is correct. As an example of (3), consider a procedure that calls for a patient to undergo surgery, a treatment that carries some risk of harm, independent of the patient's other problems.

In some embodiments, the software can access records of the interviewee contained in storage, such as the memory 180 of the server system 170. The interviewer screen provides the interviewer with access to certain records through GUI controls. Data contained in the stored records may also be taken into account in ranking options for questions, instructions, and treatment as described in the previous paragraph.

In a particular embodiment, the interviewee system 140, the server system 170, and the interviewer system 100 are adapted to cooperate to create the illusion of a live person on the scene working with the relevant user. In particular, the various systems are adapted to utilize communication theory and persuasion technology to enhance communications and to improve the acceptance of instructions. For example, in high tension situations, the device is adapted to adopt a calming technology, such as calming sounds and visuals, to facilitate communications. In a particular example, an emergency response professional may enter preliminary information into an interviewee system to initialize the system for a particular interviewee. For example, the interviewee may tell the professional that he speaks Spanish. The interviewer can configure the interviewee system 140 for Spanish, and identify the gender of the user. Once configured, certain diagnoses (such as pregnancy-related issues) may be omitted, and the interviewee system 140 can be provided to the interviewee. The interviewee system 140 can display a visual image of a emergency professional and provide prompts in the interviewee's native language. Further, the interviewee system can prompt the interviewee through a series of questions as the emergency response professional prepares the interviewee for transportation to a treatment facility, such as a hospital.

In a particular embodiment, the interviewer system 100, the server system 170, the interviewee system 140, or any combination thereof can include interpretation logic (or instructions executable by the logic) to interpret a communication into the user's native language and in a culturally relevant fashion. In this particular instance, the interpreted text may not be a translation, but may instead be a summary or a interpretation of a particular communication. The logic 125, 155, and 175 of the interviewer system 100, the interviewee system 140, and the server system 170 may be adapted to interpret particular communications into an appropriate language and into a culturally relevant communication for the particular user. Further, the culturally relevant communications (such as particular cultural mores that may need to be observed in treating a particular patient or in obtaining a patient's consent to treatment) may be communicated to both the interviewer and the interviewee via the logic. For example, in a culture where only the head of a household may provide consent to treatment, the logic 125 may notify the interviewer that obtaining consent may be difficult unless the head of the patient's household can be located. Further, the logic 155 can ask the interviewee if he/she is the head of the household, and if not, whether he/she knows how the interviewer can reach the head of the household to obtain consent for a particular treatment. In this instance, interpretation of the question "Do you consent to medical treatment?" may result in a culturally relevant interpretation "Are you the head of your household or do we need to contact someone who can consent to medical treatment on your behalf?"

Ranking Topics for the Interviewer

Figure 2:
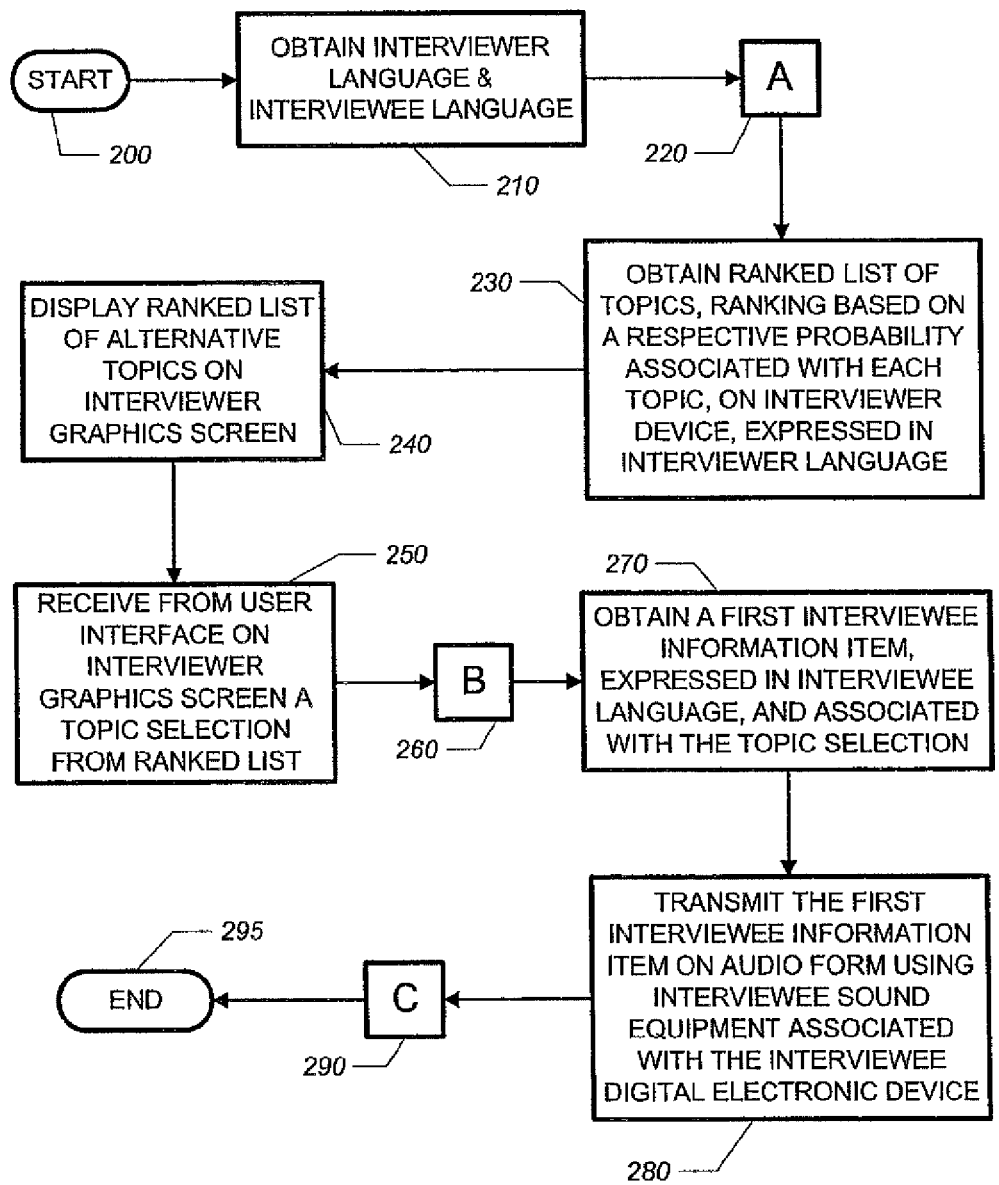
FIG. 2 is a flow diagram of a particular illustrative embodiment a method of situational language interpretation.

FIG. 2 is a flow diagram illustrating an embodiment of a method of providing situational language interpretation in which the interviewer selects a topic from a ranked list in the interviewer's language, thereby causing audio information to be communicated to the interviewee in the interviewee's language. After the start 200 of the method, a choice of an interviewer language and a choice of an interviewee language are obtained 210 by logic in digital form. In a particular embodiment, the two language choices could be obtained in a variety of ways, including, for example, the interviewer might choose his language through a GUI on an interviewer graphics screen 115, and the interviewee might choose her language through a GUI on an interviewee graphics screen 145.

The block 220 designated "A" in the flowchart represents several options. In some embodiments, block 220 "A" is a null step and is simply ignored. In other embodiments, block 220 "A" includes creating a ranked list of topics. In a particular embodiment, the ranked list can be created by the server system logic 175 utilizing information stored in the server electronic storage 180. In other embodiments, the ranked list can be created by the interviewer system logic 125 within the interviewer system 100. In a particular embodiment, the ranked list is determined by a respective probability of each topic within the list, by an expected loss associated with each topic, based upon information stored in a database regarding the interviewee, based upon information collected or measured from the interviewee, or any combination thereof. In a particular example, a database can be maintained by a memory 180 of the server system 170 (illustrated in FIG. 1). In the medical response example, the database could include identification, demographic, and medical records regarding the interviewee, as well as other information.

In block 230, a ranked list, expressed in the language of the interviewer, is obtained by the interviewer system 100. In some embodiments, the ranked list is obtained by receiving it across a network from a server. If the ranked list is created locally within the interviewer system 100, the ranked list is obtained from the result of the creation step.

The ranked list is then displayed 240 on the interviewer graphics screen 115. At 250, a topic selection is received by logic in the interviewer system 100. Ordinarily, the interviewer will make this selection from the ranked list of topics through the GUI on the interviewer graphics screen 115. Data related to the selection may be communicated to the server system 170, to the interviewee device 140, or to the display screen of the interviewer system 100.

In some embodiments, at 260, designated as block "B" in the flowchart a null step is performed or the step is simply ignored. In other embodiments, block "B" represents the step of transmitting the topic selection electronically across a network, ordinarily to the server system 170.

At 270, first interviewee information item, associated with the topic selection and expressed in the interviewee language, is obtained. In a particular example, this information item can be received across a network by the interviewee system 170 from the server system 170. Advancing to 280, the first interviewee information item is then transmitted using interviewee sound equipment 160 associated with the interviewee system 140.

In some embodiments, continuing to 290, the block 290 designated "C" in the flowchart, can be a null step and is simply ignored. In other embodiments, the block 290 "C" represents receiving an interviewer information item at the interviewer system 100 from the system server 170, from a network, from the interviewee system 140, directly, or any combination thereof. In an embodiment, the interviewer information item is expressed in the interviewer language and is associated with the topic selection. Further, block 290 "C" can represent broadcasting the interviewer information item to the interviewer using interviewer sound equipment (such as the headset 135) acoustically.

In another embodiment, the block 290 "C" can represent receiving at the interviewee system 140 a second interviewee information item from the interviewer system 100 or from the server system 170. The second interviewee information item can be associated with the topic selection, and the second interviewee information item can be displayed on the interviewee graphics screen 145. In a particular embodiment, the second interviewee information item includes a three dimensional object for display on the interviewee graphics screen 145. The block 290 "C" can include obtaining an interviewee signal from an interviewee graphics screen 145, such as a user selection; sending information related to the interviewee signal to electronic storage (such as the memory 180 of the server system 170 illustrated in FIG. 1); and using logic 155 of the interviewee system 140 to display the three dimensional object in a translated or a rotated form relative to the first configuration. The method ends at step 2.95.

Summarizing Information for the Interviewer

Figure 3:
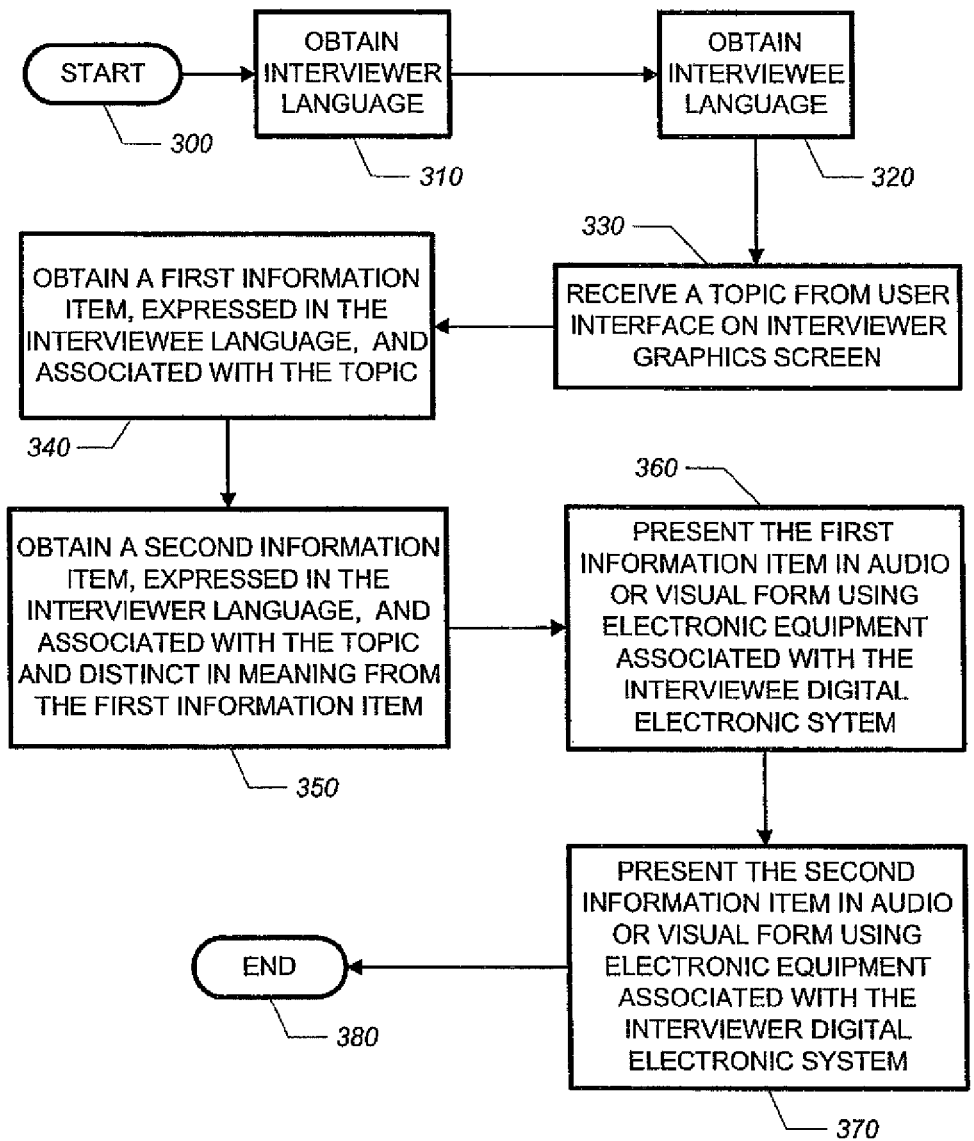
FIG. 3 is a flow diagram of a second particular illustrative embodiment of a method of situation language interpretation, where the interviewer receives only a summary of an information item sent to the interviewee.

FIG. 3 is a flowchart illustrating an embodiment of a method of providing situational language interpretation in which the interviewer receives only a summary of an information item sent to the interviewee. After the start 300 of the method, at 310, an interviewer language identifier is obtained by logic. At 320, an interviewee language is obtained via logic. The logic may be incorporated within a single device, within a server system including multiple servers, or distributed between multiple devices. Continuing to 330, a topic is obtained from an interviewer via an interviewer system that includes a user interface displayed on an interviewer graphics screen 115. Proceeding to 340, a first information item associated with the topic is obtained that is expressed in the language of the interviewee. Advancing to 350, a second information item associated with the topic is obtained that is expressed in the language of the interviewer. In a particular embodiment, the second information item is distinct in meaning from the first information item. In particular, the second information item can be a summary of the first information item. In another particular embodiment, the first and second information items can be the same text interpretated into different languages.

At 360, the first information item is presented in audio form, visual form, or any combination thereof to the interviewee via the headset 165, the speaker 166, the display 145, or any combination thereof. At 370, the second information item is presented in audio form, in visual form, or any combination thereof to the interviewer via the headset 135, the display 115, or any combination thereof. The method ends at 380.

Choosing a Language by the Interviewee

Figure 4:
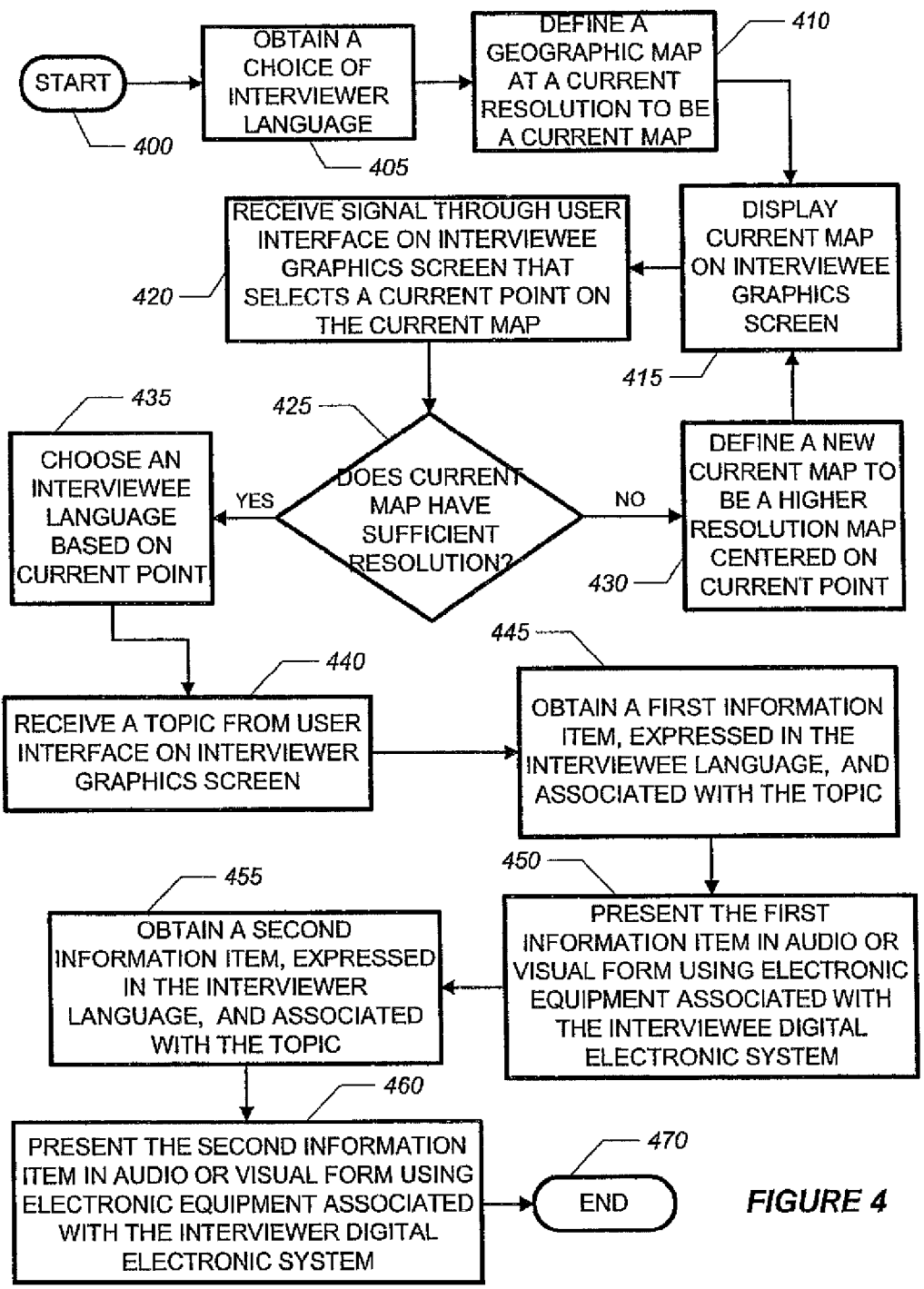
FIG. 4 is a flow diagram of a third particular illustrative embodiment of a method of situation language interpretation, where the language of the interviewee is determined by interaction of the interviewee with successively more highly resolved maps.

FIG. 4 is a flowchart illustrating an embodiment of a method of situational language interpretation in which the language of the interviewee is determined by interaction of the interviewee with successively more highly resolved maps. After the start 400 of the method, at 405, a choice of interviewer language is obtained via logic. For example, the interviewer might select his language from a GUI displayed on an interviewer graphics screen 115. At 410, a current geographic map at a first resolution is defined as a current map. For example, the first resolution might represent a map of the world at a sufficiently coarse resolution to fit on a display screen, such as the display device 145.

Advancing to 415, the current map is displayed on an interviewee graphics screen 145. Continuing to 420, a signal is received through a user interface on the interviewee graphics screen 145 (or via an input device, such as a mouse, a pointer, another input device, or any combination thereof) that represents a selection of a point on the current map.

Moving to 425, logic then determines whether the current map has sufficient resolution for a user to distinguish among regions shown by the current map where different languages are spoken to specify a particular language. If the current map is still too coarse, the method advances to 430, and a new current map is defined at a higher resolution map centered on the selected (current) point. The method returns to 415, and the new current map is displayed on the interviewee's graphics screen.

Returning to 425, if the current map has sufficiently high resolution, then the method advances to 435, and an interviewee language is chosen by associating the current point with a language spoken at the geographic location of the current point. In a particular embodiment, the interviewee language can be distinct from the interviewer language. Further, in another embodiment, an identifier associated with the selected interviewee language can be stored at the server system 170.

Continuing to 440, data related to a topic is received that is related to a user interface displayed on an interviewer graphics screen 115. In some embodiments, data related to the topic can be a topic selection chosen from a list of topics, such as a ranked list of topics. Moving to 445, logic obtains a first information item associated with the topic and expressed in the interviewee language. For example, the first information item might be obtained by sending the topic to a server system 170 across a network and receiving the first information item back from the server system 170. Advancing to 450, the first information item is then presented in audio form, visual form, or any combination thereof using electronic equipment associated with the interviewee system 140. For example, the first information might be a text item or an annotated digital image presented on the interviewee graphics screen 145, or it might be a question presented in audio form through an interviewee headset 165 or interviewee speaker 166 to the interviewee.

Continuing to 455, a second information item is obtained that is associated with the topic and expressed in the interviewer language. In a particular embodiment, the second information item can be obtain in response to sending data related to the selected topic to the server system 170, which is adapted to identify and send the second information item. In some embodiments, the first information item is an interpretation of the second information item into the language of the interviewee. In other embodiments, the first and second information items are different, such as when the second information item is a short summary of the first information item. At 460, the second information item is presented in audio form, visual form, or any combination thereof using electronic equipment associated with the interviewer system 100. The method ends at 470.

Language Interpretation

Figure 5:
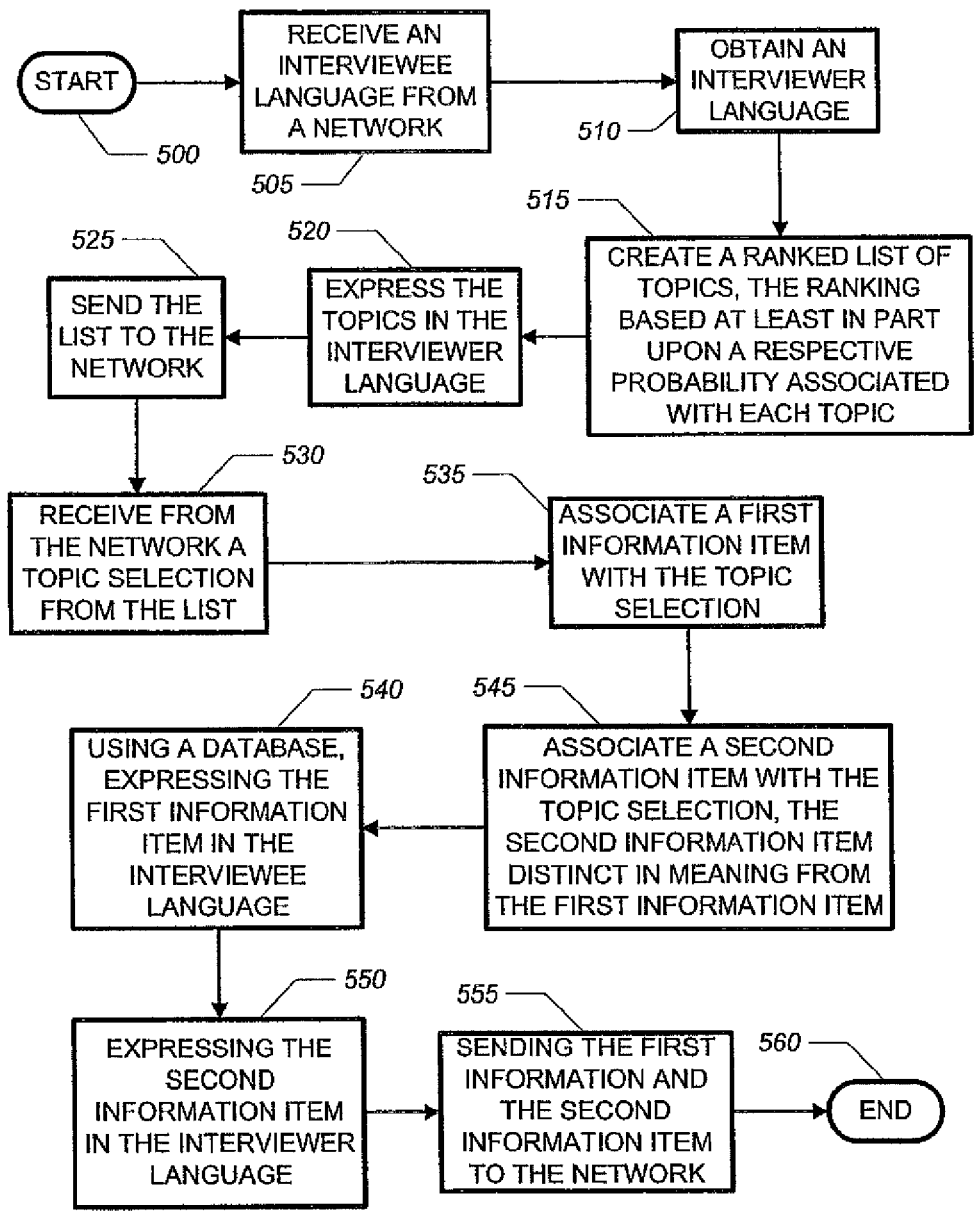
FIG. 5 is a flow diagram of a fourth particular illustrative embodiment of a method of situational language interpretation.

FIG. 5 is a flow diagram of a fourth particular illustrative embodiment of a method of situational language interpretation, which embodiment assumes that language interpretation occurs on a server system 170 that communicates with the interviewer system 100 across a network 190. After the method starts 500, at 505, data related to the interviewee language is received from a remote device (such as the interviewer system or the interviewee system) via a network.

Advancing to 510, logic obtains a choice of interviewer language. The interviewer language might be a default value, a fixed value, a value retrieved from a database based upon the identity of the interviewer; a value selected by the interviewee, or a value entered by the interviewer. Continuing to 515, a ranked list of topics is created, where the ranking based at least in part upon a respective probability related to an interviewer-selected topic. Proceeding to 520, the topics in the list are expressed in the language of the interviewer. Moving to 525, the list is sent by the server system 170 to a remote device (such as the interviewer system or the interviewee system) via the network 190.

Continuing to 530, a topic selection from the list is received via the network 190. Moving to 535, a first information item is associated with the topic selection. In a particular embodiment, the first information is associated with the topic that will be communicated to the interviewee in the interviewee's language. The first information can include a question, an instruction, a series of questions or instructions, audio data, video data, or any combination thereof. Advancing to 540, a second information item is associated with the topic selection. In a particular embodiment, the second information item has a distinct interpretation relative to the first information item. For example, the second information item might be a summary of the first information item. In another embodiment, the first and second information items can have the same meaning.

At 545, using a database, the first information item is expressed in the interviewee language. In a particular embodiment, the database includes hundreds of possibilities for the interviewee language. Continuing to 550, the second information item is expressed in the interviewer language. If there are more than one interviewer languages available, interpretation data may be retrieved from a database. Moving to 555, the first and second information items are sent to the interviewer system, the interviewee system, or any combination thereof via the network. The method ends at 560.

Multiple Interviewers

Figure 6:
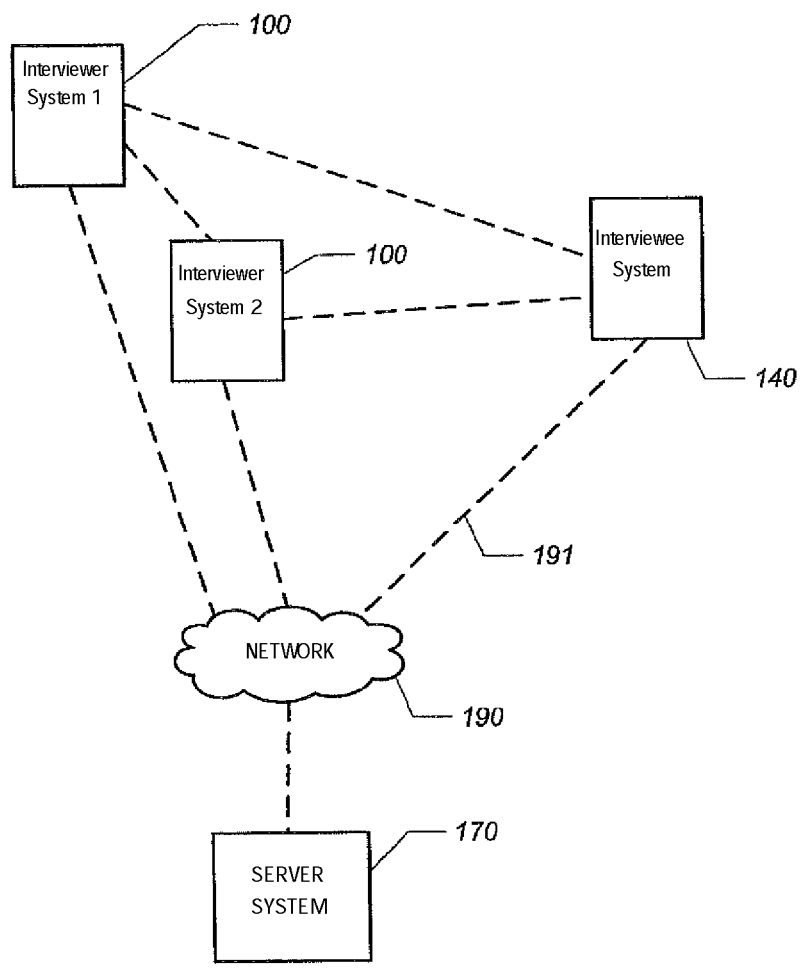
FIG. 6 is a diagram of a second particular embodiment of a system for situational language interpretation including two interviewer systems.

FIG. 6 is a diagram of a second particular embodiment of a system for situational language interpretation including two interviewer systems 100 and 100' and an interviewee system 140, connected by communications links shown as dashed lines and typified by the one labeled 191. The interviewer systems 100,100' and the interviewee system 140 can communicate with a server system 170 across a network 190. Communication among the interviewer systems 100,100' and interviewee system 140 can be implemented with wireless technology such as Bluetooth. In a particular embodiment, the interviewer systems 100,100', the interviewee system 140, the server system 170, and the network 190 can include the components illustrated in FIG. 1.

In a particular embodiment, the first interviewer system 100 and the second interviewer system 100' can be adapted to display information in different languages, such that information displayed on each respective interviewer graphics screen 115 and transmitted through each respective interviewer sound equipment, such as the headset 135, will be expressed in the language of the particular interviewer. The interviewee might prefer a language different from both interviewers, or might share a common language with one of them. Information displayed on the interviewee graphics screen 145 and transmitted through the interviewee sound equipment 160 can be expressed in the language of the interviewee, regardless of which interviewer system 100 may have caused a transmission to be sent to the interviewee system 140.

Multiple Interviewees

Figure 7:
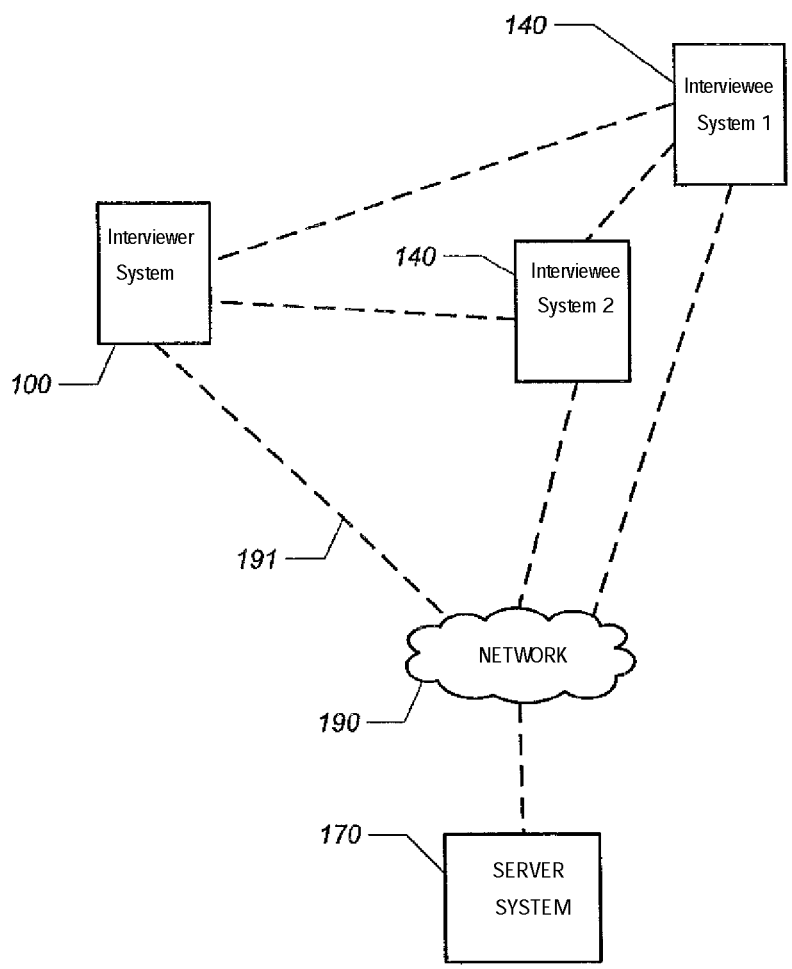
FIG. 7 is a diagram of a third particular embodiment of a system for situational language interpretation including two interviewee systems.

FIG. 7 is a diagram of a third particular embodiment of a system for situational language interpretation including two interviewee systems, including interviewee systems 140, 140' and an interviewer system 100 connected by communications links shown as dashed lines and typified by the one labeled 191. The interviewer system 100 and the interviewee systems 140, 140' can communicate with a server system 170 across a network 190. In a particular embodiment, communication among the interviewer system 100 and the interviewee systems 140,140' can be implemented with wireless technology such as Bluetooth. Whether the interviewees choose the same language or not, information displayed on each respective interviewee graphics screen 145 and transmitted through each respective interviewee sound equipment 160 can be expressed in the language of that interviewee. The interviewer might or might not share a common language with one or the interviewees. Information displayed on the interviewer graphics screen 115 and transmitted through the interviewer sound equipment, such as the headset 135, will be expressed in the language of the interviewer.

Convertible Headset

A medical emergency is a good example of a situation in which a service provider needs a great deal of functionality both in capturing and utilizing measurements, and in communicating with a patient and potentially other people. In a particular embodiment, the system for situational language interpretation includes a headset (such as the headsets 135 and 165 illustrated in FIG. 1) that, in some embodiments, converts into a speaker system. Further, in particular embodiments, the headset can be a data server including a data storage medium and a processor, with interfaces to peripheral devices, such as sensors, cameras, speakers, microphones, thermometers, other devices, or any combination thereof. Further, the headset is adapted to communicate with the interviewer system, the interviewee system, the server system, or any combination thereof.

In a particular embodiment, it may be desirable to allow multiple people to hear the audio data, such as where the patient is a child and where his/her parents are present. To address this situation, a headset is disclosed that includes ear cups that can be adjusted between at least two configurations: a head-mount configuration and a broadcast configuration. In its head-mount configuration the ear cups are adapted to transmit audio information to the ears of just one individual. In its broadcast configuration, the headset is adapted to broadcast audio information through the ear cups to a plurality of people. To change between the two configurations, a user performs a mechanical transformation that includes a rotation or pivoting the ear cups. In a particular embodiment, the system can automatically adjust the maximum sound amplitude available based on the mechanical state of the ear cups so that the maximum volume of the ear cups is greater in the broadcast configuration than in the head-mount configuration. It will be assumed here for purposes of discussion that the headset has two ear cups, although a headset with only one ear cup behaves analogously and is within the scope of the discussion.

In a particular embodiment, when the headband is in the head mount configuration, it is substantially elliptical in shape. A pivotal attachment allows one of the arches to be folded toward the other. In a particular illustrative embodiment, each arch lies within a plane. In the broadcast position, the planes of these two arches are substantially parallel to each other. As used herein, the term "substantially parallel" means that the planes of the two arches intersect at an angle less than 45 degrees. In a particular embodiment, the planes of the arches intersect at an angle less than 20 degrees. In some embodiments, the planes of the arches are actually parallel or within 5 degrees of being parallel. In the broadcast position, the two arches can fold into a single arch, with the two ear cups at the base of the arch, one on each tine of the arch. In the broadcast configuration, each ear cup is pivotally attached to its respective tine, allowing it to rotate into a position where the transmission direction of the ear cup is in substantially the same direction. In the resulting broadcast configuration, the headset can rest on a surface such as a table top, supported by at least one of the arches of the folded headbands and possibly also the speakers.

In some embodiments, the headband automatically adjusts to fit the head size of the user. In some such embodiments, the headband includes interlocking segments. The headset expands when the interlocking segments as the segments are pulled gradually apart. In some embodiments, an elastic band or cord is threaded through the segments connecting pairs of adjacent segments together. The elastic connector stretches to create a force that opposes stretching. The elastic therefore keeps the segments in position so that the headband fits the head of the wearer snugly.

Figure 8:
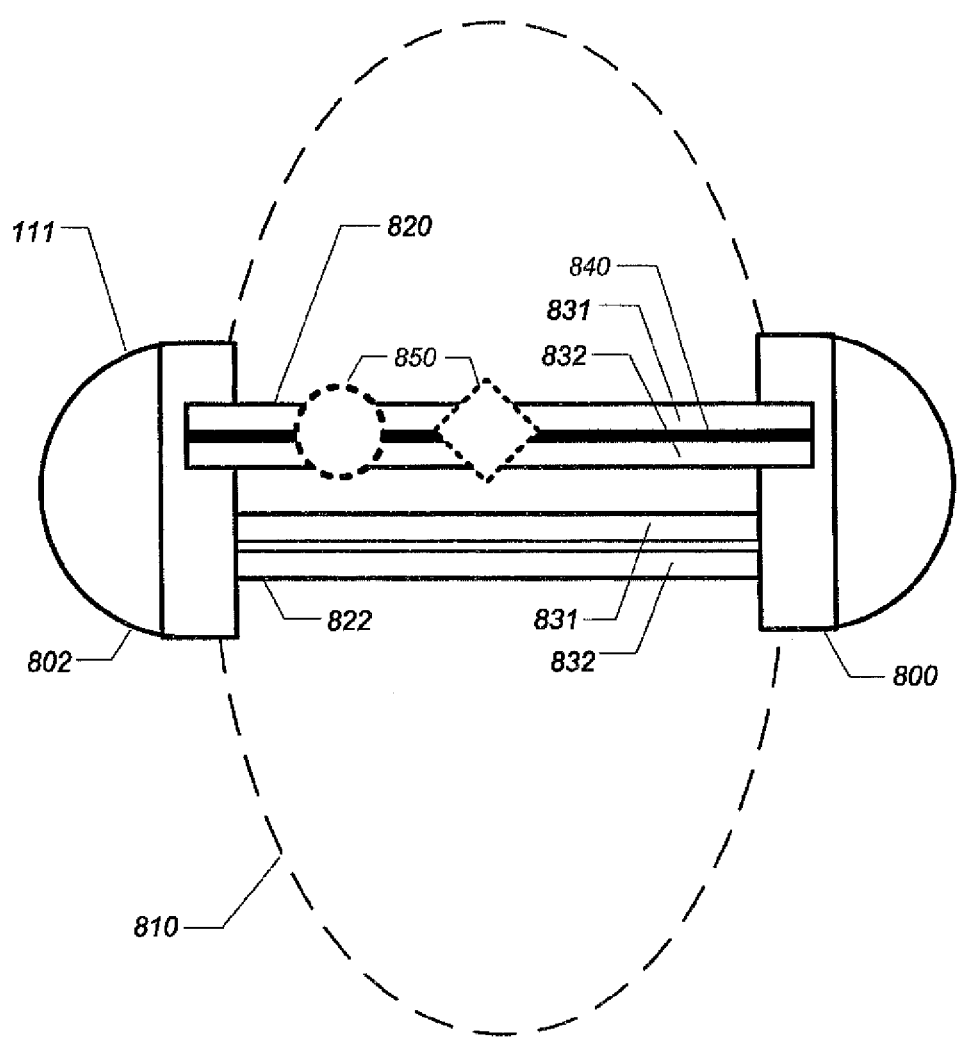
FIG. 8 is a front view of a particular illustrative embodiment of a headset for use with a situational language interpretation system.

FIG. 8 is a front view of an embodiment of a headset 111 that includes both speaker functionality and storage server functionality. In this form, the headset 111 can function as either an interviewer headset 135 or an interviewee headset 165 (illustrated in FIG. 1). The headset 111 is shown in its head-mount configuration where left and right ear cups 801 and 802, respectively, of the headset 111 are directed toward one another. The headset 111 further includes a headband 815. The ear cups 801 and 802 are adapted to transmit audio information to a user. An outline of a head to clarify the head-mount configuration is indicated by the dashed line 810.

In some embodiments of the invention, the headband 815 includes a forehead arch 820 and a nape arch 822. The forehead arch 820 fits around the forehead of a user, and the nape arch 822 fits around the nape of the neck of the user, typically at the base of the skull. While the two arches 820,822 are both in substantially horizontal planes when the headset 111 is being worn, the two planes can be offset vertically for a better fit, providing stability and comfort for a particular user. Also to give a better fit, the two arches 820,822 can include upper and lower ribs 831 and 832, which can be fabricated from or covered with a soft material. Further, the headset 811 can be equipped with a pluggable component bus 840, which is discussed below in connection with FIGS. 24 through 26. The headset 811 further includes two pluggable components 850, which are attached to the bus 840.

Figure 9:
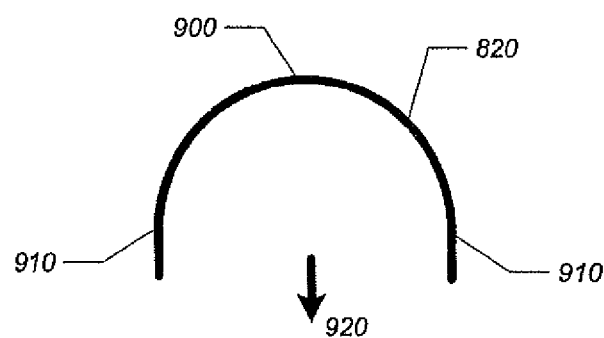
FIG. 9 is diagram of an arch of the headset of FIG. 8.

FIG. 9 is included to define some terms relating to arch geometry that will be used throughout the rest of this document. It should be understood that this discussion applies to both the forehead arch 820 and the nape arch 822. As shown, the forehead arch 820 includes a curved portion 900 and two tines 910. An arch 820 in mathematics has zero thickness and lies strictly in a plane. When, as in the present invention, an arch 820 is fabricated from tangible materials, the arch 820 lies substantially in a plane. The shape of the arch 820 defines an opening direction indicated by an arrow 920.

Figure 10:
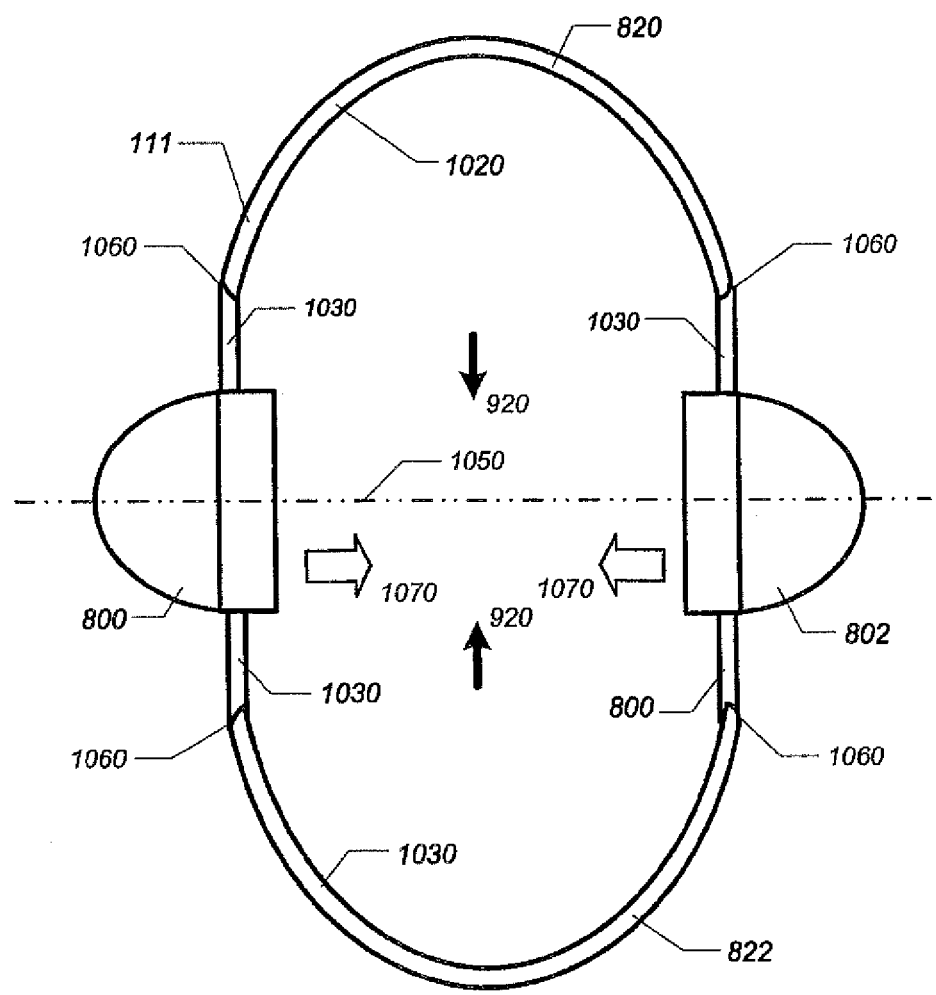
FIG. 10 is a top view illustrating the headset of FIG. 8 in a head-mount configuration.

FIG. 10 is a top view illustrating the headset 111 of FIG. 8 in a head-mount configuration. The headset 111 is in its head-mount configuration showing the headband 815 with its two headband arches 820, 822. Transformation from this configuration into a speaker system requires a rotation of the forehead arch 820 and nape arch 822 relative to each other about the arch rotation axis 1050. In this embodiment, each arch 820,822 consists of three headband segments, including a curved segment 1020 and two straight segments 1030. In another particular embodiment, the headband 815 can include additional segments or fewer segments. In a particular example, the headband 815 can be formed with a single segment. The segments 1020, 1030 connect at joints 1060. The arches 820,822 expand at their joints 1060, permitting the headband 815 to be easily put on or taken off by the user. In the head-mount configuration, the ear cups 800 are oriented to primarily transmit sound inward in the transmission direction shown by the arrows 1070. In the head-mount configuration, the transmission direction 1070 of each ear cup 800,802 is perpendicular to the opening direction 920 of each arch 820, 822.

Figure 11:
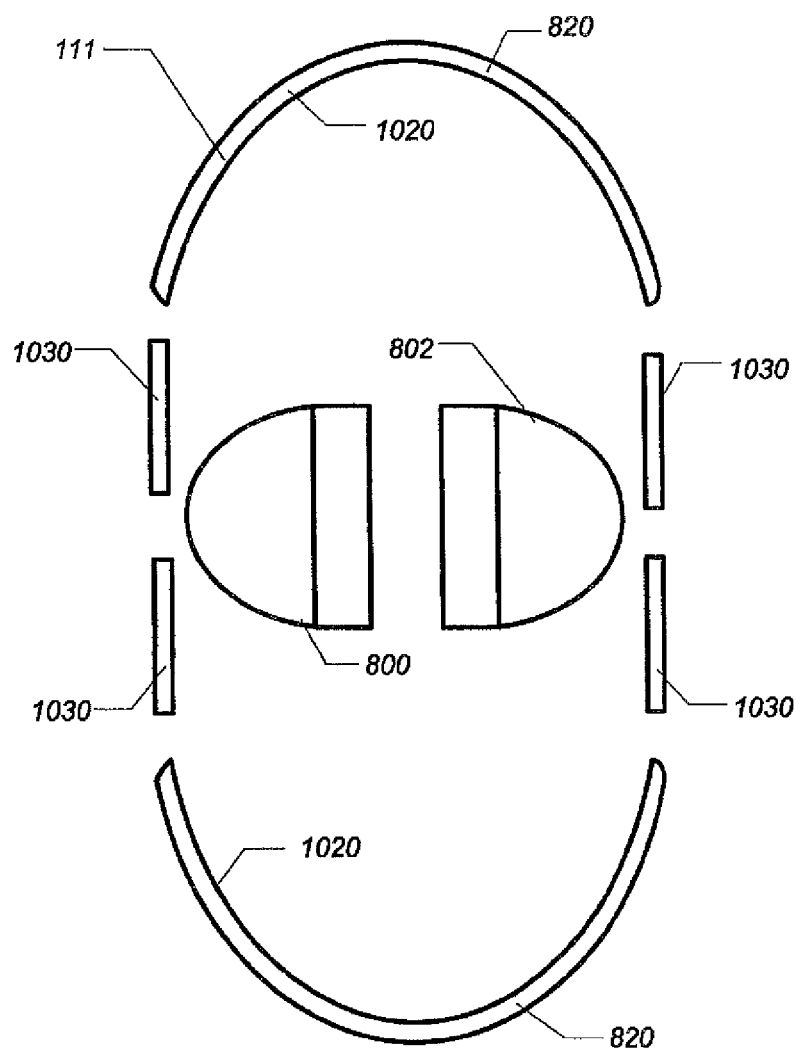
FIG. 11 is a top view of a second particular illustrative embodiment of the headset including a set of ribs, which can be included in a headband.

FIG. 11 shows segments 1020, 1030 of the forehead arch 820 and the nape arch 822 separated at the joints 1060, which joints are represented by the spaces between the segments 1020, 1030. In this embodiment, the headband 815 can be expanded to place the headband on a user's head.

Figure 12:
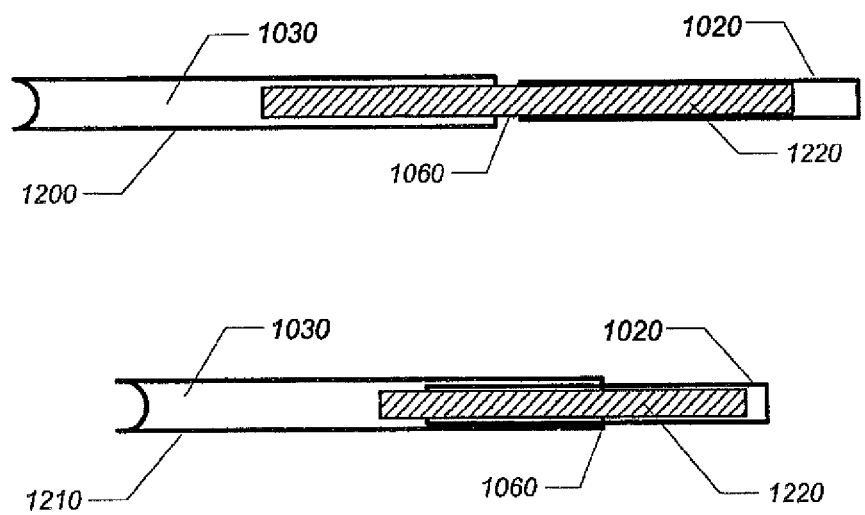
FIG. 12 is a cross-sectional view of a particular illustrative embodiment of a portion of a headband of a headset including an expandable headband rib joint.

FIG. 12 is a cross-sectional view of a particular illustrative embodiment of a portion of a headband of a headset including an expandable headband rib joint 1060 within a rib of a headband arch 820. The upper drawing shows the expanded joint 1200, and the lower drawing shows the contracted joint 1210. The two segments (arbitrarily oriented with a curved segment 1020 on the right of a straight segment 1030) are connected with an elastic connector 1220, which might be in the form of a stretchable band or a stretchable cord. The elastic connector 1220 allows the segments 1020, 1030 to be expanded to make the headset 111 easy to put on or take off, while keeping the fit snug on the user's head. When the joint 1060 is contracted, one segment 1020 fits inside the other segment 1030, in a nesting or telescoping manner as shown. In this case, the elastic connector 1220 has a minimum length. When tension is applied to pull the segments 1020, 1030 apart, the elastic connector 1220 lengthens, and overall the length of the arch increases. When the tension is removed, the elastic pulls the segments 1020, 1030 into a telescoping relation. In a particular embodiment, to remove the headset 111, the user 811 can pull forward on the forehead arch 821 with one hand and backward with the nape arch 822 with the other, then upward with both hands.

Figure 13:
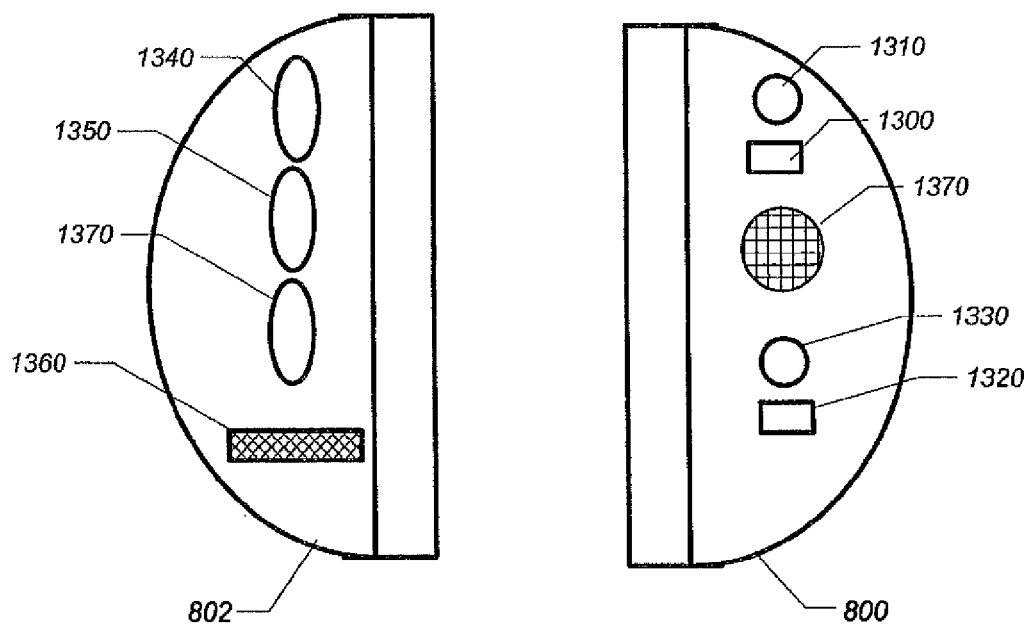
FIG. 13 is a side view of the headset of a particular illustrative embodiment of ear cups of a headset including human interface controls, an expansion slot, and wireless interfaces.

FIG. 13 is a side view of the headset of a particular illustrative embodiment of ear cups of a headset including human interface controls, an expansion slot, and wireless interfaces. The interface controls are shown on the ear cups 800,802, but one or more of them may alternatively be located on the headband 815. Such interface controls can include a power button 1300 to enable or disable electrical functionality of the headset 111. A power indicator 1310 (such as a light emitting diode (LED)) may indicate whether the headset 111 is powered on.

The headset 111 may have a mute button 1320 to disable sound from being broadcast electronically to the ear cups 800,802, the status of muting being indicated by a mute indicator 1330 (such as an LED). In some embodiments, muting the ear cups 800, 802 also removes a barrier 1370 to ambient sound entering the ear cups 800. This could be implemented, for example, with a motorized trap door over an opening or with a manual slider. A paramedic, for example, might need to hear what is going on around him without taking the headset 111 off. Muting the electronically transmitted sound would accomplish this without powering down the headset 111. The ear cups 800,802 may have a fixed sound level, a sound level adjustment control in the headset 111, or a sound level adjustment control in some other system in communication with the headset 111, such as the interviewer system 100.

The headset 111 might have a personal area network (PAN) interface 1340, such as a Bluetooth interface. A PAN has limited range, which would be an advantage in a hospital context, and would be perfectly adequate for wireless communication between the headset 111 and the interviewer system 100 or the interviewee system 140 of the invention.

The headset 111 might also have a wide area network (WAN) interface 1350, such as one providing TCP/IP (Transmission Control Protocol/Internet Protocol) connectivity. The interface 1350 allows, for example, wireless or wired communication between the headset 111 and the server system 170 to communicate data, to download information or instructions (including executable program code), to provide other communications, or any combination thereof. In some embodiments, the headset 111 is intimately involved with collecting and storing data from sensors, which data can be recorded by the server system 170. The headset 111 might also have a local area network (LAN) interface 1370, which might be useful in a business or home environment.

The headset 111 further includes an expansion slot 1360 adapted to receive an expansion circuit, such as a flash memory card, a universal serial bus (USB) adapter card, other circuitry, or any combination thereof. Using the expansion slot 1360, a user can upload data by wire, power a light (such as a headlamp attached to the headband), or insert a compact removal digital storage device, such as a flash memory device. In a particular example, the expansion slot can be adapted to support USB 2, FIREWIRE, other technology, or any combination thereof. In some embodiments (not shown), the headset 111 also includes a sound volume control.

Figure 14:
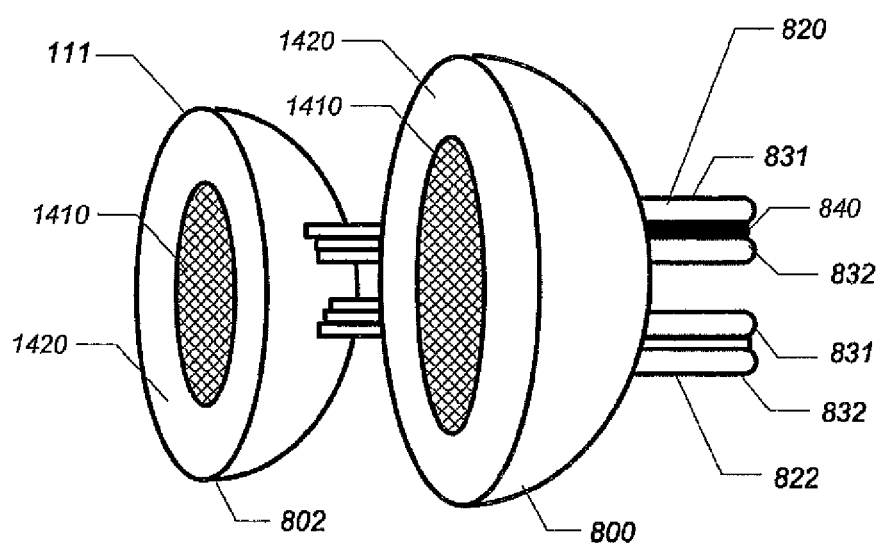
FIG. 14 is a perspective view of a particular illustrative embodiment of the headset of FIG. 8 configured in a broadcast configuration.

FIG. 14 is a perspective view of an embodiment of the invention when the headset 111 is in a broadcast configuration. In the broadcast configuration, the headset 111 is configured to behave as a speaker system. As shown, in this configuration, the ear cups 800,802 face in the same transmission direction 1070. The arches 820,822 are folded on top of each other, so that they both are oriented with the same opening direction, such as the direction 920 illustrated in FIGS. 9 and 15. The sound-emitting surface 1410 of each ear cup 800,802 is shown. The ear cups 800,802 transmit audio information outward from the ear cups 800,802 substantially perpendicularly to the sound-emitting surface 1410. Surrounding the sound-emitting surfaces 1410 is a soft surface or earmuff 1420 that both seals out external sound and makes the ear cups 800,802 fit comfortably against the ears and the side of the head of the user when in a head-mount configuration. Further, the headset 111 includes a headband having forehead and nape arches 820,822. The two arches 820,822 include upper and lower ribs 831 and 832 and a pluggable component bus 840. In the broadcast configuration, the two arches 820, 822 are substantially parallel to one another.

Figure 15:
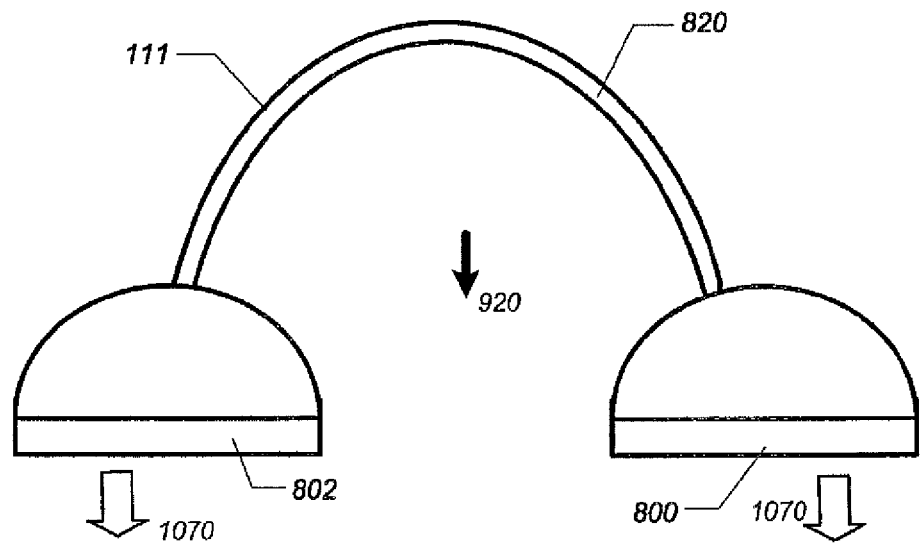
FIG. 15 is a top view of the headset of FIG. 14 in the broadcast configuration.
Figure 16:
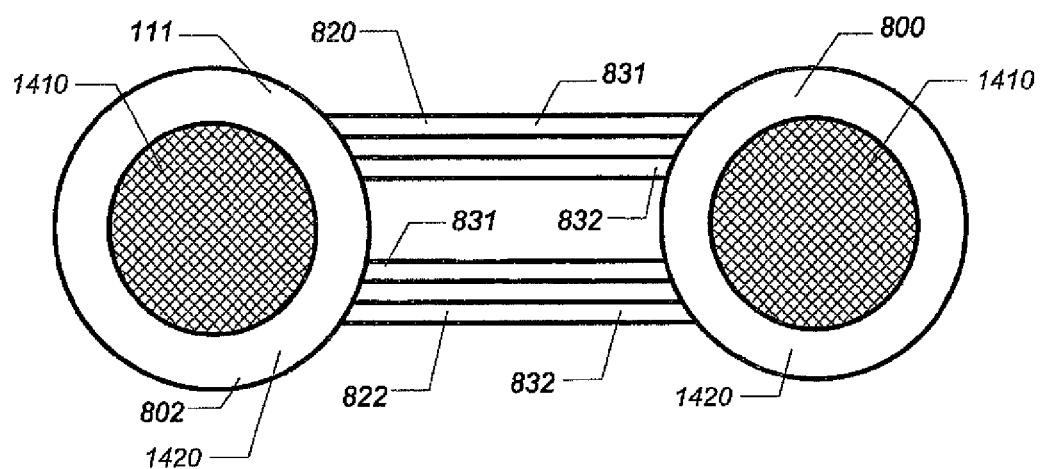
FIG. 16 is a front view of the headset the headset of FIG. 14 in the broadcast configuration.

FIG. 15 is a top view of the headset of FIG. 14 in the broadcast configuration, and FIG. 16 is a front view of the headset of FIG. 14 in the broadcast configuration.

To transform from the head-mount configuration illustrated in FIGS. 8, 10, 11, and 13 to the broadcast configuration illustrated in FIGS. 14-16, the forehead arch 820 and the nape arch 822 of the headband 815 are rotated relative to each other, and the ear cups 800 are turned outwards. In most embodiments, these steps are simply reversed to transform the headset 111 from the broadcast configuration to the head-mount configuration.

FIGS. 17 through 21 illustrate a particular structural implementation that enables the dual rotation. Many other configurations are possible that will not be shown, but which are within the scope of the invention.

Figure 17:
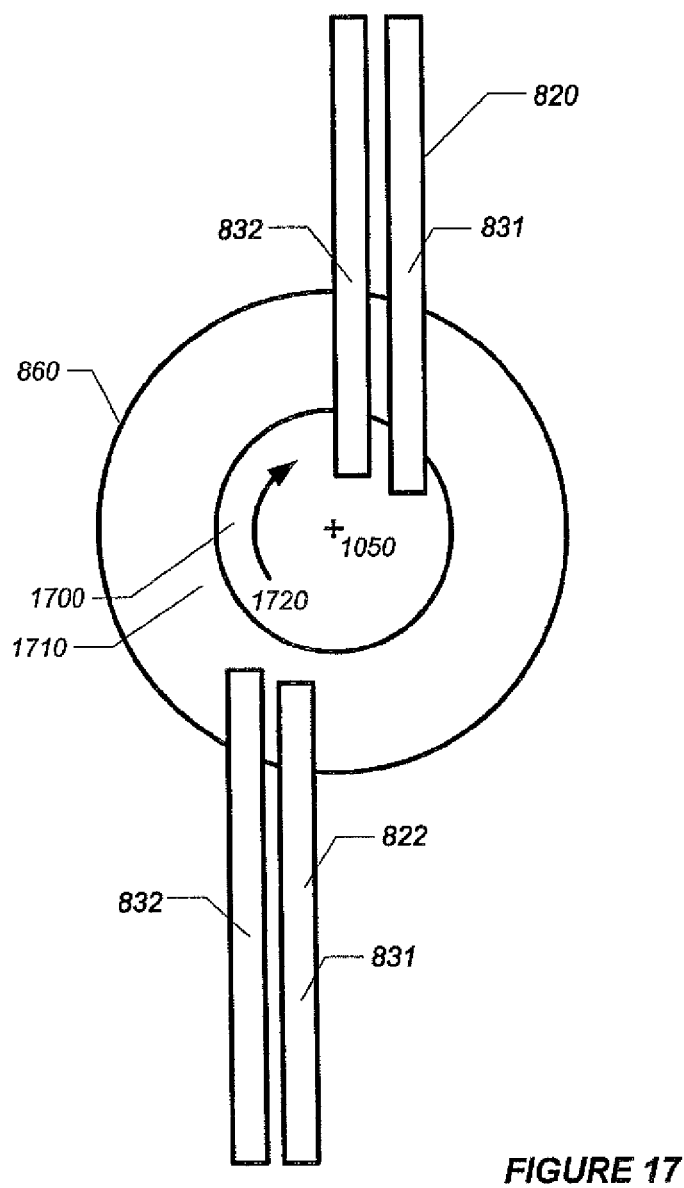
FIG. 17 is a side view of a particular illustrative embodiment of a portion of a headset including an ear cup and forehead and nape headset arches illustrating a mechanism for relative rotation of the arches in changing between the head-mount and the broadcast configurations.

FIG. 17 is a side view of a particular illustrative embodiment of a portion of a headset 111 including a rotating structure and forehead and nape headset arches 820, 822 illustrating a mechanism for relative rotation of the arches in changing between the head-mount and the broadcast configurations. The forehead and nape arches 820,822 are adapted to pivot about an arch rotation axis 1050. In this case, the nape arch 822 is configured to rotate toward the forehead arch 820 in a direction indicated by the arrow 1720. In an alternative configuration, the arches 820,822 can be adapted to rotate independently. The nape arch 822 is attached to an inner disc 1700 that is adapted to rotate in an inner ring rotation direction 1720 (and in the opposite direction to transform the headset 111 from the broadcast configuration to the head-mount configuration) within a fixed outer ring 1710 to which the forehead arch 820 is attached. The inner disc 1700 and the outer ring 1710 can be part of each of the ear cups 800, 802. Alternatively, the inner disc 1700 and the outer ring 1710 can be part of a connector that couples the arches 820,822 to the ear cups 800,802.

Figure 18:
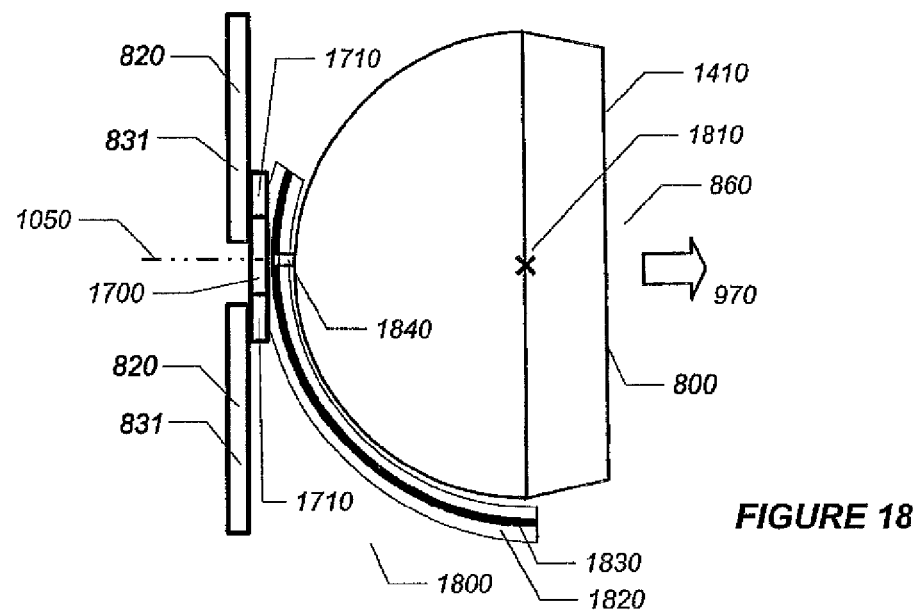
FIG. 18 is a top view of the portion of the headset illustrated in FIG. 17 including a mechanism for rotation of an ear cup relative to the headband arches into the head-mount configuration.

FIG. 18 is a top view of the portion of the headset illustrated in FIG. 17 including the mechanism for rotation of an ear cup relative to the headband arches into the head-mount configuration. In particular, the top view illustrates an ear cup rotation mechanism 1800 for pivoting the ear cups 800,802 relative to the arches 820,822 of the headband 815. In the embodiment shown, the structure of FIG. 17 is attached to a dual axis connector 1820. Because of the complexity of the figure and because the ear cup 800 and dual axis connector 1820 are both in cross-section, nothing is hatched. The dual axis connector 1820 also includes a rigid portion that is a portion of a spherical shell, which appears circular in the cross-section of FIG. 18. This spherical portion includes a hollow track 1830 in which a guide tab 1840 coupled to the rear surface (i.e., the surface opposite to the sound-emitting surface 1410) of the ear cup 800 can move. Given the geometry chosen in the embodiment of FIG. 17, the ear cup 800 is the left ear cup. To convert the headset 111 to the broadcast configuration, the ear cup 800 shown would be rotated counter-clockwise about the ear cup rotation axis 1810. If a right ear cup 802 had been shown in the figure, it would be similarly constructed, and would rotate clockwise to change from head-mount configuration to broadcast configuration.

Figure 19:
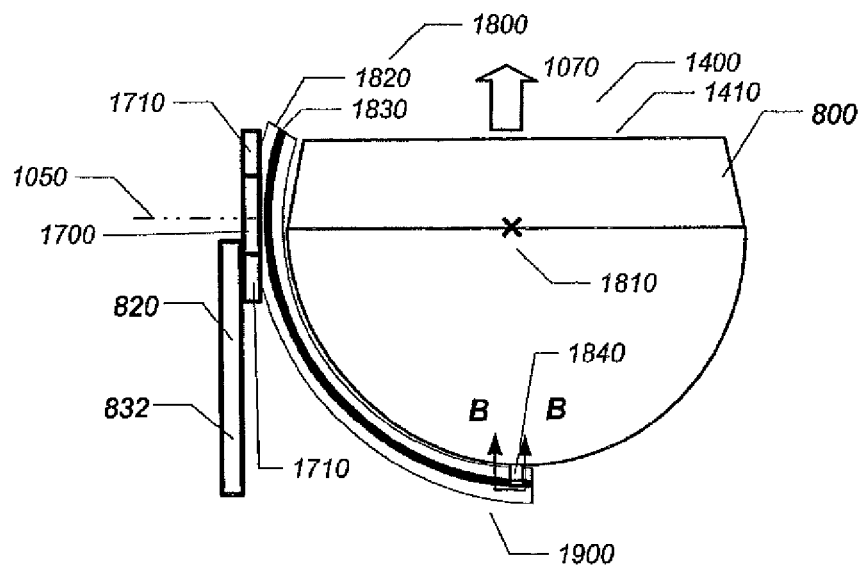
FIG. 19 is a top view of the portion of the headset illustrated in FIG. 17 including a mechanism for rotation of an ear cup relative to the headband into the broadcast configuration.

FIG. 19 is a top view of the portion 1900 of the headset illustrated in FIG. 17 including a mechanism for rotation of an ear cup relative to the headband into the broadcast configuration. Note that from this downward-looking perspective, the lower rib 832 of the forehead arch 820 obscures the other ribs 830. In this configuration, the ear cup 800 has been rotated about the ear cup rotation axis 1810 into a broadcast configuration, and the outer ring 1710 remains fixed to the ear cup via the dual axis connector 1820.

Figure 20:
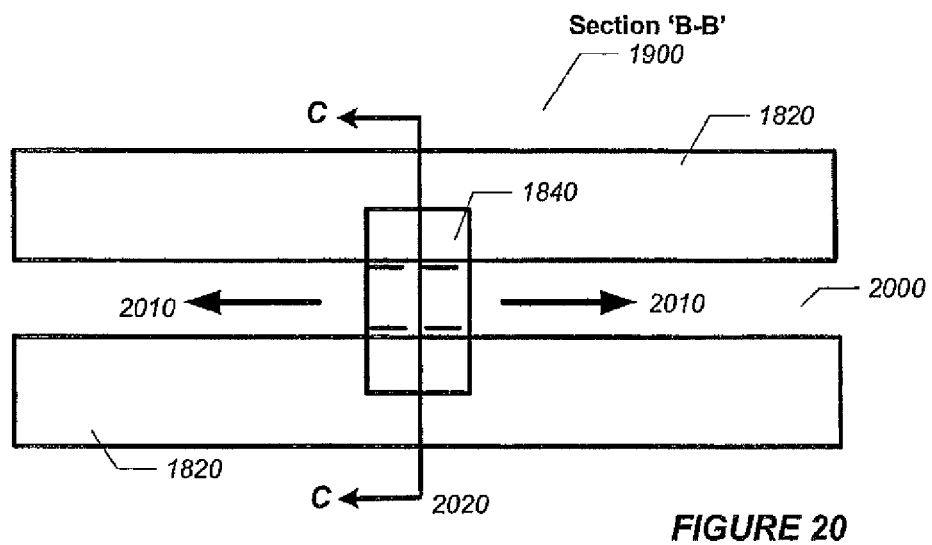
FIG. 20 is a diagram of a particular illustrative embodiment of a track for movement of a guide tab to provide ear cup rotation relative to headset arches taken along line B-B in FIG. 19.

FIG. 20 is a diagram of a particular illustrative embodiment of a track for movement of a guide tab to provide ear cup rotation relative to headset arches taken along line B-B in FIG. 19. The diagram shows the dual axis connector 1820 with a channel 2000 through which the guide tab 1840 is extended, allowing the guide tab 1840 to slide in the directions indicated by the arrows 2010 within the gap 2000.

Figure 21:
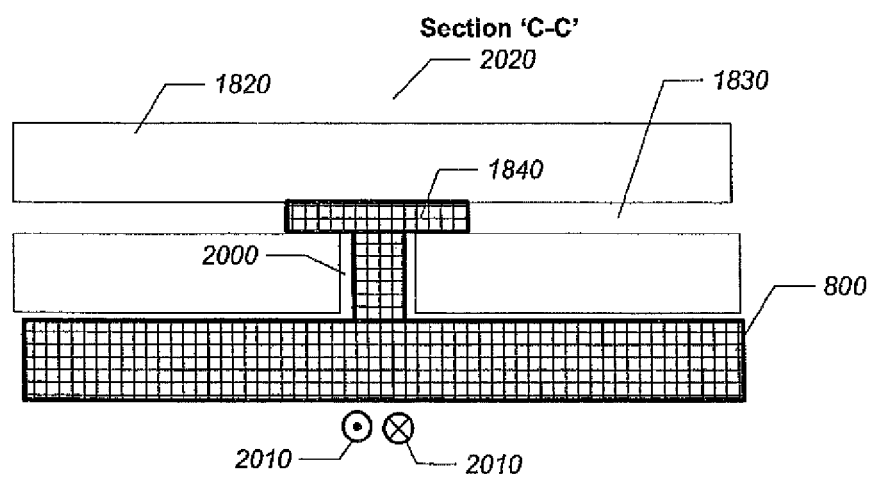
FIG. 21 is a cross-sectional view of the track and guide tab taken along line C-C in FIG. 20.

FIG. 21 is a cross-sectional view of the track and guide tab taken along line C-C in FIG. 20. In this particular embodiment, the guide tab 1840 is shaped like the upper-case letter 'T', which extends through the channel 2000 in the dual axis connector 1820 and into the hollow track 1830 to secure the ear cup 800 adjacent to the dual axis connector 1820 and to allow interpretation within the hollow track 1830 in the directions of the arrows 2010 extending into and out from the page. The lower portion of the 'T' shaped guide tab 1840 is adapted to move through the channel 2000, while the upper portion of the guide tab 1840 moves in the hollow track 1830.

In a particular embodiment, when the headset 111 is in the head-mount configuration, the maximum amplitude of the ear cups 800 can be less than in the broadcast configuration. The conditional volume can be enforced by the electronics within the headset 111. In a particular example, the electronics can automatically change the range of amplitudes available based on the configuration of the ear cups 800,802. If the headset 111 is powered on when the configuration is changed, the sound volume will automatically be changed.

Figure 22:
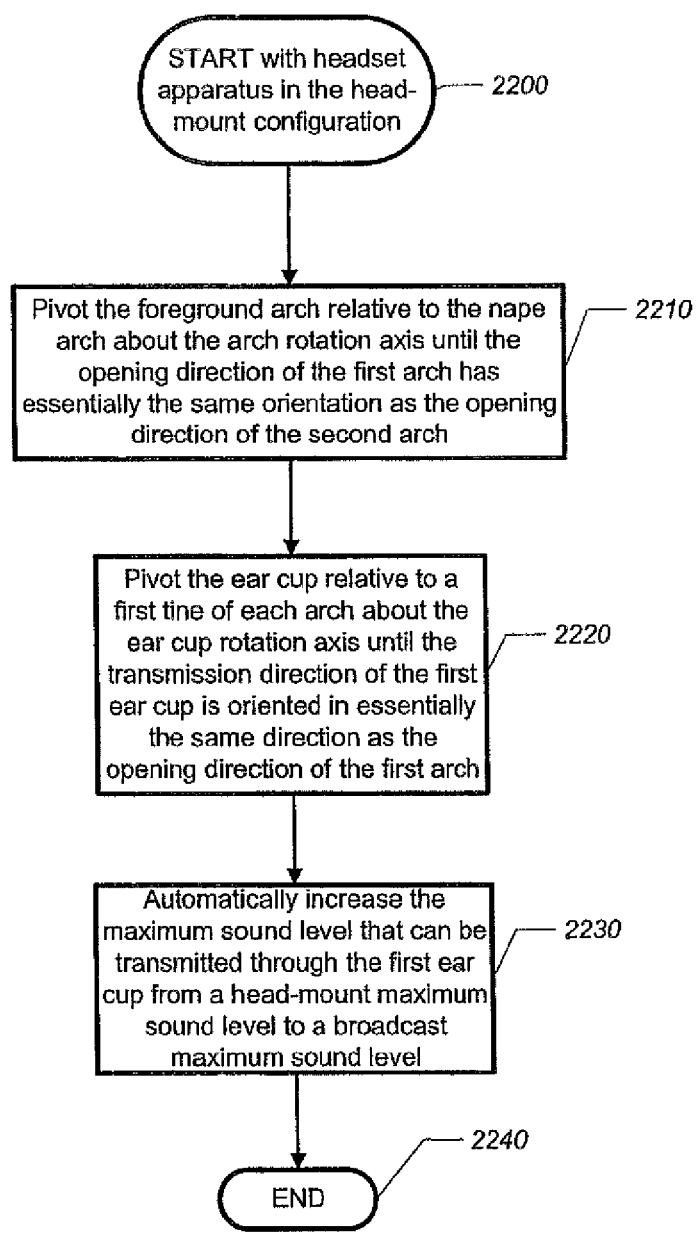
FIG. 22 is a flow diagram of a particular illustrative embodiment of a method for changing a headset from a head-mount configuration to a broadcast configuration.

FIG. 22 is a flow diagram of a particular illustrative embodiment of a method for changing a headset from a head-mount configuration to a broadcast configuration. It should be understood that the method described with respect to FIG. 22 relates to a single ear cup 800, but that the method may be applied to a dual ear cup headset. At 2200, the method starts with the headset in the head-mount configuration. Advancing to 2210, the forehead arch 820 is pivoted relative to the nape arch 822 about the arch rotation axis 1050 until the opening direction 920 of the first arch 820 has essentially the same orientation as the opening direction 920 of the second arch 822. Moving to 2220, the ear cup 800 is pivoted relative to a first tine 910 of each arch 820,822 about the ear cup rotation axis 1810 until the transmission direction 1070 of the ear cup 800 is oriented in substantially the same direction as the opening direction of the first arch 820. In a particular embodiment, this second rotation can be performed manually. In another particular embodiment, the second rotation can be associated with the first rotation such that the second rotation is performed automatically by a mechanical or electrical system. Proceeding to 2230, a maximum sound level that can is transmitted through the first ear cup is automatically increased from a head-mount maximum sound level to a broadcast maximum sound level. The method terminates at 2240.

Figure 23:
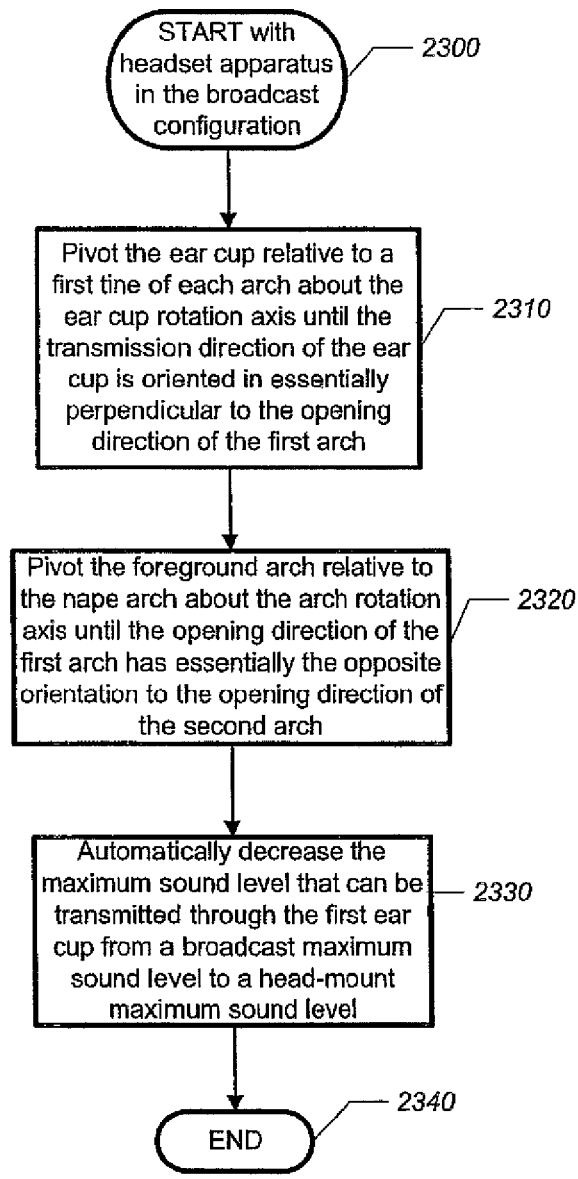
FIG. 23 is a flow diagram of a second particular illustrative embodiment of a method for changing a headset from a broadcast configuration to a head-mount configuration.

FIG. 23 is a flow diagram of a second particular illustrative embodiment of a method for changing a headset from a broadcast configuration to a head-mount configuration. At 2300, the method starts with the headset 111 in the broadcast configuration. Advancing to 2310, the ear cup 800 is pivoted relative to a first tine 910 of each arch 820 about the ear cup rotation axis 1810 until the transmission direction 1070 of the ear cup 800 is oriented substantially perpendicular to the opening direction of the first arch 820. Moving to 2320, the forehead arch 821 is pivoted relative to the nape arch 822 about the arch rotation axis 1050 until the opening direction 920 of the first arch 820 has a substantially opposite orientation to the opening direction 920 of the second arch 820. In a particular embodiment, the second rotation may be performed manually. In another particular embodiment, the second rotation can be coupled to the first rotation, such that the second rotation is performed automatically in response to the first rotation by a mechanical or electrical system. Continuing to 2330, the maximum sound level that can be transmitted through the first ear cup 800 is automatically decreased from a broadcast maximum sound level to a head-mount maximum sound level. The method terminates at 2340.

Figure 24:
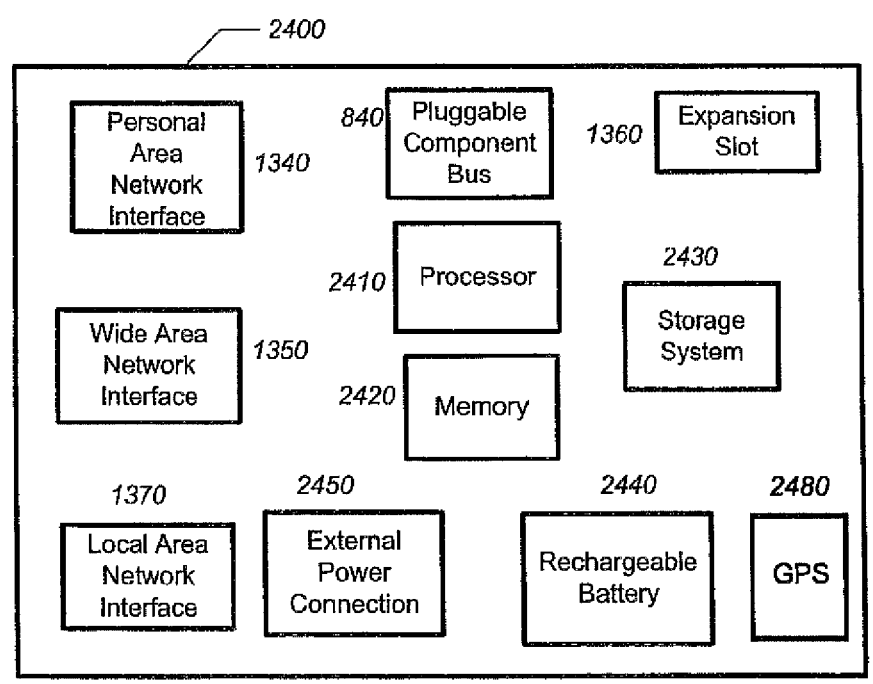
FIG. 24 is a block diagram of a particular illustrative embodiment of a headset system.

FIG. 24 is a block diagram of a particular illustrative embodiment of a headset system 2400. In a particular embodiment, the headset system 2400 can be incorporated within a headset 111, which can be adjusted between head-mount and broadcast configurations. The processing system 2400 has a power system, including a battery (such as a rechargeable battery 2440) and a power connection 2450 to an external power source, such as a wall plug. In a particular embodiment, the rechargeable battery 2440 and the external power connection 2450 can be coupled together to allow the rechargeable battery 2440 to recharge when the headset system 2400 is coupled to an external power source via the external power connection 2450.

The headset system 2400 further includes a processor 2410 having access to a memory 2420, which can store processor executable software instructions. The memory 2420 can be a hard disk drive, a flash memory, a read only memory, another memory device, or any combination thereof. Such software programs, possibly augmented by hardware components, provide logic for functions to be performed by the processing system 2400, such as logic allowing the headset 111 to act as a storage server. The processor 2410 can execute an operating system and has communication access to the other components of the headset system 1400.

The headset system 2400 includes a storage system 2430, typically including a controller and a storage device. The storage system 2430 might be a hard drive, a DVD drive, a flash memory, or any other system adapted for storage and retrieval of information in digital form. The processing system 2400 will include one or more network interfaces, such as a PAN interface 1340, a WAN interface 1350, a LAN interface 1370, other interfaces, or any combination thereof. In a particular embodiment, the WAN interface 1350 can be a wireless access point that can provide other devices with access to the WAN. The headset system 2400 also includes an expansion slot 1360 to receive additional memory or to communicate with one or more peripheral devices. Further, the headset system 2400 also includes a pluggable component bus 840, such as a USB bus, a FIREWIRE bus, another type of communication interface, or any combination thereof.

In a particular embodiment, the headset system can also include one or more circuits to communicate with sensors and/or to receive inputs from a user. In a particular embodiment, the headset system 2400 can serve as a data collection hub for the interpretation system or any other application. Instruments can be controlled by the headset system 2400 through the pluggable component bus 840. Further, the headset system 2400 can receive data from one or more devices that are coupled to the headset system 2400 (via the expansion slot 1360, the pluggable component bus 840, the network interfaces, or any combination thereof) for storage in the storage system 2430. The data can be transmitted to the interviewer system 100, to a server system 170, to the interviewee system 140, or any combination thereof. Further, the data can be transmitted on demand or continuously while an instrument is operating, depending on the particular implementation.

In a particular embodiment, the headset system 2400 may be used in a remote location, such as at a remote site. For example, in an emergency response situation (such as in an ambulance for use by emergency management technicians (EMTs)), an EMT may utilize the interviewer and interviewee systems to communicate with a patient. In a particular embodiment, the headset system 2400 may include a global positioning satellite (GPS) system 2480, which is adapted to determine a location of the headset system 2400. In this particular example, the headset system 2400 may utilize the wide area network interface 1350 to access geographic information systems (GIS) to determine information about a particular household, such as the language spoken at that household. Alternatively, the GPS data from the GPS system 2480 can be used to limit an initial set of language options to a small subset of available languages based on the location of the headset system 2400. In an alternative embodiment, the headset system 2400 may include a portion of the GIS database in the memory 2420, so that the GPS data can be used to determine a location of the headset, and the processor 2410 can access the GIS data locally.

In another particular embodiment, the wide area network interface 1350 may include a wireless communications circuit (such as a cellular, digital, or other wireless communications circuit), which can be utilized to communicate with a wireless network. In this particular instance, the service provider access point data can be used to triangulate to determine a location of the headset system 2400. In a particular example, cellular base stations may have overlapping coverage areas, which can be utilized to determine a location based on a relative strength of the wireless signals. In this instance, the location information may be used to search the GIS database (locally or via the wide area network) and to infer a language based on the location, such as a neighborhood or household.

Additionally, the headset system 2400 can include logic to interpret a particular communication into a language of the user and into a culturally relevant form. In a particular instance, the culturally relevant form can include culturally appropriate questions/requests, culturally persuasive techniques to convince a particular interviewee to allow a certain course of treatment or diagnoses, and culturally acceptable/ understandable phrases. In a particular example, the culturally relevant form includes culturally/linguistically correct phrasing for particular communications.

Figure 25:
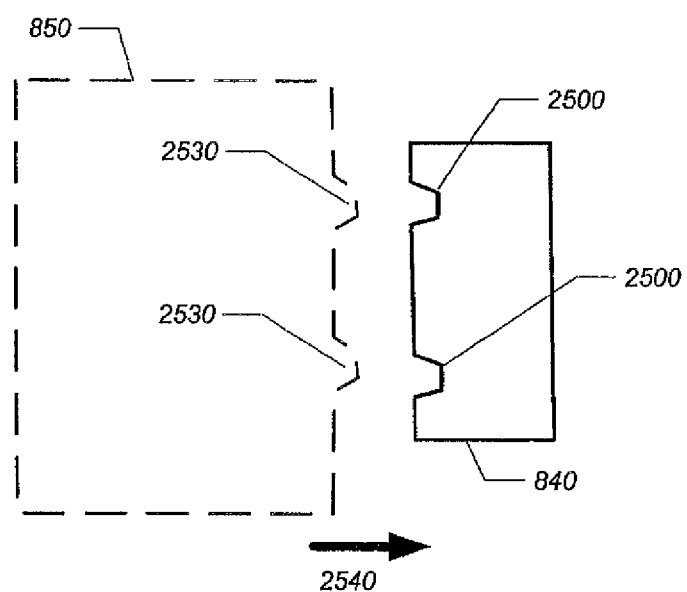
FIG. 25 is a side view of a particular illustrative embodiment of a portion of a headset system including a pluggable component bus strip illustrating coupling of a compatible pluggable component to a headband.

FIG. 25 is a side view of a particular illustrative embodiment of a portion of a headset system including a pluggable component bus 840 illustrating coupling of a compatible pluggable component to the headband. The pluggable component bus 840 includes bus alignment features 2500 (grooves) to facilitate positioning a pluggable component 850 (shown in phantom), which includes corresponding alignment features 2530 sized to mate with and to easily and accurately couple to the pluggable component bus 840 as the pluggable component 850 is brought into contact with the bus 840 in the direction of arrow 2540.

In this particular embodiment, the pluggable component bus 840 has female bus alignment features 2500 and a compatible pluggable component 850, with dashed outline, has matching male device alignment features 2530. In an alternative embodiment, the pluggable component bus 840 can have a male bus alignment feature and the compatible pluggable component 850 can have a female bus alignment feature. In a particular embodiment, the pluggable component bus 840 includes a magnetic surface, and the pluggable component 850 includes a surface adapted to being magnetically attracted to the magnetic surface of the pluggable component bus, or vice versa. In a particular embodiment, the pluggable component bus 840 furnishes power to the pluggable component 850 and facilitates communication between the pluggable component 850, the processor 2410, and other components of the headset system 2400.

Figure 26:
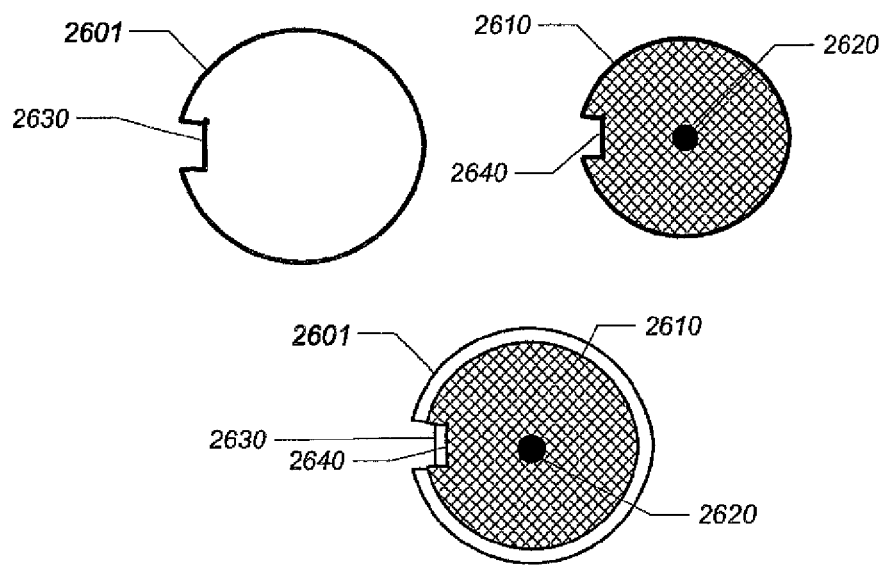
FIG. 26 is a diagram of a particular illustrative embodiment of a set of cross-sectional views of ear cups.

FIG. 26 illustrates a structure 2600 whereby power and communication can be transmitted between segments 1020, 1030 of an arch 820 of the headset 111. The structure 2600 includes a first substantially circular structure 2601 and a second substantially circular structure 2610, which includes a diameter that is less than the first substantially circular structure. Two connecting segments 1020, 1030 can be substantially cylindrical in cross-section, and can be enclosed by a gap between the first and second substantially circular structures 2601 and 2610.

The first substantially circular structure 2601 includes a power surface 2630 made of conductive material contained in a channel. The second substantially circular structure 2610 also includes a power surface 2640 within a channel. By appropriately sizing the diameters of the first and second substantially circular structures 2601 and 2610 and the sizes of their respective channels, the structure 2611 can fit inside of the structure 2601, with their power surfaces 2630 and 2640 in contact with each other. Further, the structure 2610 can include a wire chase tube 2620 for holding wires to pass between the segments. In a particular embodiment, the second structure 2610 can be slotted to fit within the first structure 2601 as shown in the lower part of the figure.

Figure 27:
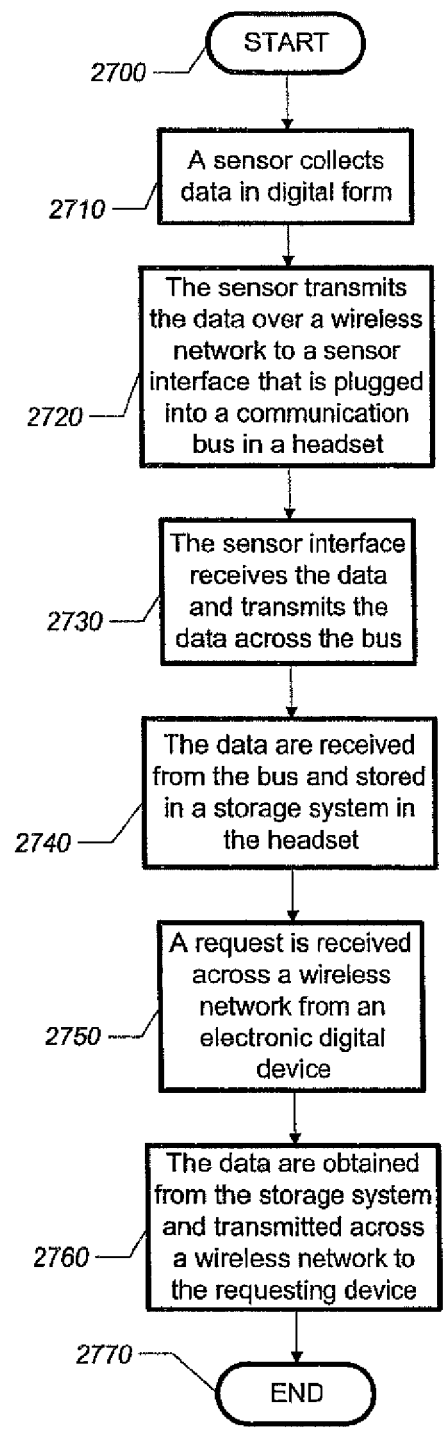
FIG. 27 is a flow diagram of a particular embodiment of a method of gathering data via a system including a headset, such as the headsets and headset portions illustrated in FIGS. 1 and 8-19.

FIG. 27 is a flow chart illustrating the data sensing and storage server functionality of the headset 111, such as the headsets and headset portions illustrated in FIGS. 1 and 8-19. The method starts at 2700. Advancing to 2710, a sensor collects data in digital form. In a particular embodiment, the sensor can be a measurement device, such as a blood pressure sensor, a heart rate sensor, a temperature sensor, another sensor, or any combination thereof. Continuing to 2720, the sensor transmits the data to a sensor interface, which is a pluggable component 850 that is plugged into a communication bus 840 in a headset 111. In a particular embodiment, the sensor interface of the headset receives the data over a wireless network (typically a PAN). In another particular embodiment, the sensor interface receives the data via a wired network or via a direct connection. Moving to 2730, the sensor interface receives the data and transmits 2730 the data across the bus 840.

Proceeding to 2740, the data are received from the bus 840 and stored in a storage system 2430 in the headset 111. Advancing to 2750, a request is received via a wireless network from an electronic digital device. The request can include a query for information stored at the device. Continuing to 2760, the data are obtained from the storage system 2430 and transmitted across a network (wired or wireless) to the requesting device. The process ends at 2770.

Figure 28:
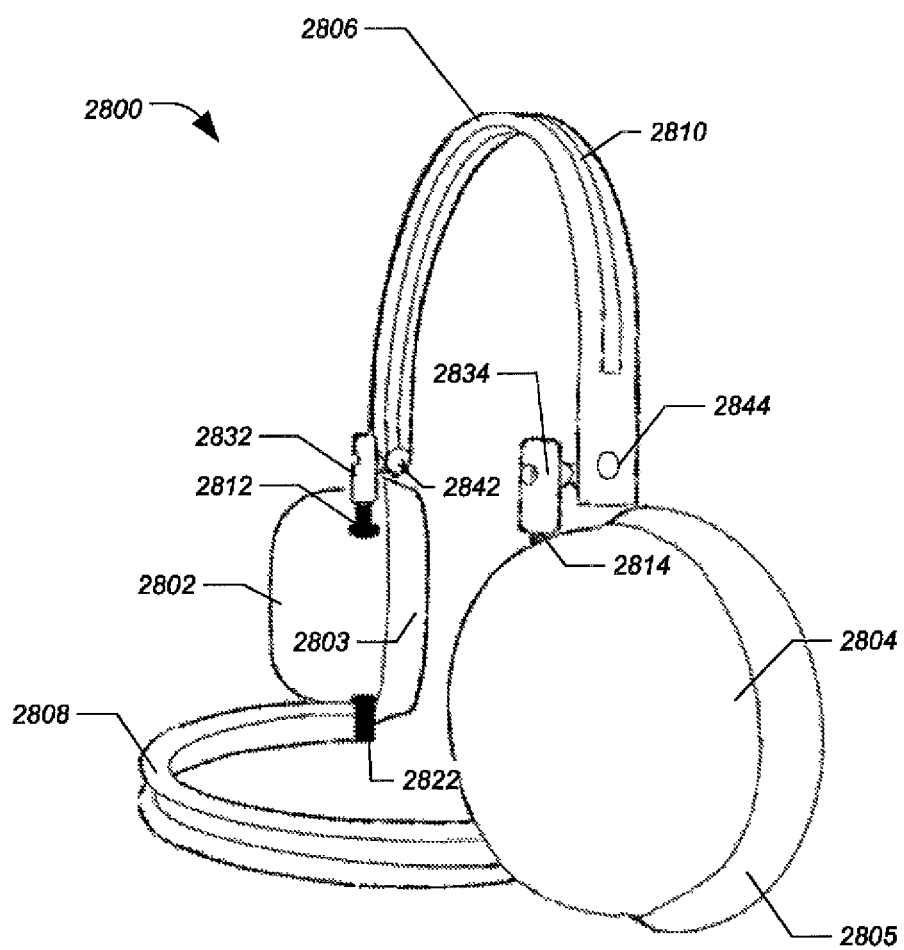
FIG. 28 is a diagram of a second particular illustrative embodiment of a headset system, which is adapted for use with the systems illustrated in FIGS. 1, 6, and 7 and which may include the ear cups illustrated in FIG. 13.

FIG. 28 is a diagram of a second particular illustrative embodiment of a headset system 2800, which is adapted for use with the systems illustrated in FIGS. 1, 6, and 7 and which may include the ear cups illustrated in FIG. 13. The headset system 2800 includes ear cups 2802 and 2804, which are coupled to a front tine 2806 and a rear tine 2808. In a particular embodiment, the front and rear tines 2806 and 2808 are adapted to fit to a forehead and nape, respectively, of a user, such as an interviewer or an interviewee. Further, the ear cups 2802 and 2804 include insulating rings 2803 and 2805, respectively, which provide sound insulation against ambient noise and which serve to provide a soft interface between the ear cups 2802 and 2804 and a user's head.

In a particular embodiment, the ear cups 2802 and 2804 can include user selectable buttons, visual indicators, and one or more interfaces, such as those illustrated with respect to the ear cups of FIG. 13. Additionally, at least one of the ear cups 2802 and 2804 can include a processor, a memory accessible to the processor, and other components (including communication interface circuitry and expansion slots), such as the processor 2410, the memory 2420, the interface circuitry 1340, 1350, and 1370, the external power connection 2450, and the expansion slot 1360 of the system 2400 illustrated in FIG. 24. The front tine 2806 includes a pluggable component bus 2810, such as the pluggable component bus 840 illustrated in FIGS. 8, 14, and 24-26 and pluggable component bus 1840 illustrated in FIG. 21.

The front tine 2806 is coupled to the ear cup 2802 via a spring-loaded articulating tensioner 2832 and bushings 2842 and 2812. Further, the front time 2806 is coupled to the ear cup 2804 via a spring loaded articulating tensioner 2834 and bushings 2844 and 2814. In a particular example, the term "bushing" can refer to a metal lining for a round hole that encloses a revolving shaft. The rear tine 2808 is coupled to the ear cup 2802 via a bushing 2822 and to the ear cup 2804 via a corresponding bushing (not shown). In a particular embodiment, the bushing 2822 and the corresponding bushing may be integrated with the rear tine 2808. In a particular embodiment, the bushing 2822 may extend through the ear cup 2802, and the bushing 2812 may be a visible portion of the bushing 2822.

In a particular example, the bushings 2812, 2822, and 2814 are adapted to allow the front and rear tines 2806 and 2808 to be adjusted relative to the ear cups 2802 and 2804. In a particular embodiment, the spring-loaded articulating tensioners 2832 and 2834 are adapted to articulate by ninety degrees. In the arrangement shown, the front tine 2806 can be used as a carrying handle to carry the headset system 2800. Further, the front tine 2806 can be articulated into a position that is substantially parallel to the rear tine 2808. Additionally, the bushings 2812, 2822 and 2814 allow the ear cups 2802 and 2804 to be rotated to face outward for a broadcast configuration, which may be used to produce an audio signal that is audible to multiple users.

It should be understood that the headset system 2800 can be coupled to a system, such as the interviewee system 140 or the interviewer system 100 illustrated in FIG. 1, via a wired connection, a wireless connection, or any combination thereof. Further, it should be understood that the embodiment of the headset system 2800 and the embodiments of the headsets illustrated in FIGS. 8-21, and 24-26 are provided for illustrative purposes only, and are not intended to be limiting. Other embodiments of adjustable headsets including the functionality disclosed above, such as the adjustable ear cups and adjustable head band (tines or segments), are also within the scope of this disclosure.

CONCLUSION

In conjunction with the systems and methods disclosed above with respect to FIGS. 1-28, a system is disclosed that includes three digital electronic systems, namely, an interviewer system, an interviewee system, and a server system. In some embodiments, the three systems are disjoint (distributed), although there is communication among them. In this particular instance, each system contains components distinct from those of the other systems. In another embodiment, some hardware or software components are shared between systems. In still another embodiment, all three systems are housed in a single device, such as a personal computer (PC). The systems can communicate information with each other by standard means, such as a personal area network (PAN) (e.g., one implemented with Bluetooth technology) local area network (LAN), wide area network (WAN), utilizing wired or wireless connections. For embodiments within an integrated system, modules may communicate via message passing internal to a single system. Further, in some systems, communication between systems may be indirect; for example, all communication between the interviewee system and the server system might pass through the interviewer system.

The present invention is not limited to all the above details, as modifications and variations may be made without departing from the intent or scope of the invention. Consequently, the invention should be limited only by the following claims and equivalent constructions.

Although the present invention has been described with reference to preferred embodiments, workers skilled in the art will recognize that changes may be made in form and detail without departing from the spirit and scope of the invention.

What is claimed is:

1. A system comprising:
   a speaker to output audio information;
   an interviewee interface to communicate with an interviewee display device;
   a processor and a memory accessible to the processor, the memory comprising instructions executable by the processor to:
   determine an interviewee language from a plurality of languages through interviewee input into an interviewee system;
   store collected data and data related to the determined interviewee language;
   receive interviewee information associated with a topic selection from an interviewer system in response to a prompt conveyed to the interviewee system from the interviewer system wherein the interviewer system comprises an interviewer interface to communicate with an interviewer display device wherein the interviewee information includes a first interviewee information item and a second interviewee information item;
   provide the first interviewee information item to the speaker for acoustic output in the interviewee language, and
   provide the second interviewee information item to the interviewee interface to communicate with the interviewee display device;
   a first logic system responsive to the interviewee language and configured to automatically prompt the interviewee with questions having possible answers that are culturally associated with the interviewee language and wherein the logic is responsive to answers to said questions for prompting the interviewee with additional questions; and wherein the interviewee and interviewer language is not the same and the interviewee interface to communicate with the interviewee display device displays input received from the interviewer interface to communicate with the interviewer display device; and the interviewee interface receives input from the interviewee.

2. The system of claim 1, wherein the interviewee system comprises a headset including at least one ear cup coupled to a headband.

3. The system of claim 2, wherein the at least one ear cup is rotationally adjustable to convert the at least one ear cup from a head-mount configuration to a broadcast configuration.

4. The system of claim 2, wherein the headset includes logic to automatically adjust a range of audio output transmission amplitudes based a configuration of the at least one ear cup.

5. The system of claim 2, wherein the headset comprises a pluggable component bus adapted to communicate with at least one peripheral device.

6. The system of claim 5, wherein the pluggable component bus comprises at least one alignment feature to facilitate coupling between the pluggable component bus and the at least one peripheral device.

7. The system of claim 1, wherein the system comprises a portable communication device including the display device.

8. The system of claim 1, further comprising a second logic system adapted to:
interpret an interviewer information item associated with a topic selection from the interviewer system into an interpreted information item in the interviewee language, and
provide the interpreted information item to the speaker.

9. The system of claim 1, further comprising a pluggable communication bus adapted to communicate with an input device to collect data in digital form from an interviewee.

10. The system of claim 9, wherein the input device comprises at least one of a blood pressure sensor and a temperature sensor.

11. The system of claim 10, further comprising at least one network interface adapted to communicate with a network, wherein the system is adapted to provide collected data to at least one of the interviewer system and a server system for storage.

12. The system of claim 1, wherein the interviewee system and the interviewer system are contained in one housing.

13. The system of claim 1, wherein the interviewee system and the interviewer system are in different housing.

14. The system of claim 1, wherein the interviewee input is with a graphical user interface on the display device.

15. The system of claim 1, wherein the interviewee input is audio input.

16. A method comprising:
receiving an interviewer language selection from an interviewer system at a server system;
providing a ranked list of topics in the interviewer language to the interviewer system, the topics ranking based at least in part upon a respective probability associated with each topic;
receiving an interviewee language selection from an interviewee system at the server system, wherein the interviewee language is different from the interviewer language;
receiving data related to a selected topic of the ranked list of topics from the interviewer system;
automatically prompting the interviewee with questions having possible answers that are culturally associated with the interviewee language;
prompting the interviewee with additional questions in response to answers to said questions;
determining a first and second interviewee information item associated with the selected topic using logic associated with the server system;
transmitting the determined first interviewee information item to the interviewee system in the interviewee language according to the received interviewee language selection; and
transmitting the determined second interviewee information item to the interviewer system in the interviewer language according to the received interviewer language selection.

17. The method of claim 16, wherein the interviewee language and the interviewer language are different.

18. The method of claim 16, further comprising creating the ranked list of topics from a plurality of topics, wherein a ranking of each item in the ranked list is determined in part according to a respective probability that the particular item is relevant to a particular interview situation.

19. The method of claim 18, wherein the ranking of each item in the ranked list is further determined at least in part upon a respective expected loss associated with each topic.

20. The method of claim 18, wherein the respective probability associated with each topic is determined at least in part based upon information stored in a database related to a particular interviewee.

21. The method of claim 16, providing interviewer information to the interviewer system, wherein the interviewer information comprises a summary related to the interviewee information.

22. The method of claim 16, wherein the interviewer system and the interviewee system are included within the same device.

23. The method of claim 16, wherein, before receiving the interviewee language selection, the method further comprises:
generating a first map having a first resolution at the server system;
providing the first map to the interviewee system;
receiving a selection related to the first map;
generating a second map having a second resolution based on the received selection; and
providing the second map to the interviewee system.

24. The method of claim 23, further comprising iteratively generating maps and providing maps at successively higher resolutions and receiving interviewee selections related to the generated maps until a language associated with the interviewee can be determined based on received interviewee selection data.

* * * * *